(12) United States Patent
Okuda et al.

(10) Patent No.: US 11,124,666 B2
(45) Date of Patent: Sep. 21, 2021

(54) INK SET AND INK JET RECORDING METHOD

(71) Applicant: Seiko Epson Corporation, Tokyo (JP)

(72) Inventors: Ippei Okuda, Shiojiri (JP); Akiko Matsuzaki, Matsumoto (JP)

(73) Assignee: Seiko Epson Corporation

( * ) Notice: Subject to any disclaimer, the term of this patent is extended or adjusted under 35 U.S.C. 154(b) by 273 days.

(21) Appl. No.: 16/361,375

(22) Filed: Mar. 22, 2019

(65) Prior Publication Data

US 2019/0292392 A1 Sep. 26, 2019

(30) Foreign Application Priority Data

Mar. 23, 2018 (JP) .............................. JP2018-056043
Oct. 15, 2018 (JP) .............................. JP2018-194400

(51) Int. Cl.
| | | |
|---|---|---|
| *B41M 5/00* | (2006.01) | |
| *C09D 11/40* | (2014.01) | |
| *C09D 11/033* | (2014.01) | |
| *C09D 11/037* | (2014.01) | |
| *C09D 11/107* | (2014.01) | |
| *C09D 11/322* | (2014.01) | |
| *C09D 11/54* | (2014.01) | |
| *C09D 11/38* | (2014.01) | |

(52) U.S. Cl.
CPC .......... *C09D 11/40* (2013.01); *B41M 5/0011* (2013.01); *B41M 5/0023* (2013.01); *C09D 11/033* (2013.01); *C09D 11/037* (2013.01); *C09D 11/107* (2013.01); *C09D 11/322* (2013.01); *C09D 11/38* (2013.01); *C09D 11/54* (2013.01)

(58) Field of Classification Search
CPC . B41M 5/0011; B41M 5/0023; C09D 11/033; C09D 11/037; C09D 11/107; C09D 11/40
See application file for complete search history.

(56) References Cited

U.S. PATENT DOCUMENTS

| | | |
|---|---|---|
| 2008/0118657 A1 | 5/2008 | Taverizatshy et al. |
| 2011/0069109 A1 | 3/2011 | Tojo |
| 2012/0236070 A1 | 9/2012 | Okuda et al. |
| 2015/0210055 A1 | 7/2015 | Pervan |

FOREIGN PATENT DOCUMENTS

| | | |
|---|---|---|
| EP | 2 497 803 A1 | 9/2012 |
| EP | 2 894 203 A1 | 7/2015 |
| JP | 2007-144966 A | 6/2007 |
| JP | 2012-193280 A | 10/2012 |
| JP | 5303467 B2 | 10/2013 |
| JP | 2015-183112 A | 10/2015 |

OTHER PUBLICATIONS

Extended European Search Report for Application No. EP 19 16 4658 dated Aug. 14, 2019 (6 pages).

*Primary Examiner* — Lamson D Nguyen
(74) *Attorney, Agent, or Firm* — Harness, Dickey & Pierce, P.L.C.

(57) ABSTRACT

An ink set for ink jet recording that adheres ink to a heated recording medium includes first and second water-based ink compositions. The first water-based ink composition contains a first solid content including a first coloring material and a first organic solvent. The second water-based ink composition contains a second solid content including a second coloring material and a second organic solvent. The first ink composition contains 5% by mass or more of the first solid content than the second solid content contained in the second ink composition. The second ink composition contains 7% by mass or more of the second organic solvent than the first organic solvent contained in the first ink composition.

20 Claims, 3 Drawing Sheets

INK SET AND INK JET RECORDING METHOD

BACKGROUND

1. Technical Field

The present invention relates to an ink set and an ink jet recording method.

2. Related Art

An ink jet recording method is a method of performing recording by ejecting small ink droplets from fine nozzles and causing the small ink droplets to adhere to a recording medium. This method makes it possible to record an image with high resolution and high quality at a high speed with a relatively inexpensive apparatus.

In recent years, performing direct recording (printing) of a product label or the like on a soft wrapping film such as a PET film by an ink jet recording method has been examined. The soft wrapping film is used for wrapping food or the like, and it is desirable to use a water-based ink for the aforementioned printing since high safety is required for such a purpose. In a case in which a water-based ink is used, a heating and drying processing may further be performed after the printing.

Since a recorded surface of the soft wrapping film is made of a plastic material such as polyolefin, nylon, or polyester, for example, the recorded surface is transparent or semi-transparent in many cases. Therefore, a predetermined image may be formed with color ink on a layer formed with white-based ink that is called an underlayer that hides a background when ink jet recording is performed (see JP-A-2012-193280, for example). In a case in which white ink and color ink are used, the white ink may include a large amount of white pigment while the content of the pigment in the color ink may be smaller than that in the white ink.

In a case of performing recording on a heated recording medium using ink with a large solid content and ink with a small solid content, a problem of positional deviation in an image may occur.

SUMMARY

An advantage of some aspects of the invention is to provide an ink set and a recording method capable of suppressing positional deviation in an image in a case of performing recording on a heated recording medium using ink with a large solid content and ink with a small solid content.

The inventors conducted intensive studies to solve the aforementioned problem. As a result, the inventors discovered that it was possible to suppress positional deviation in an image formed with two ink compositions by employing compositions such that the content of an organic solvent in an ink composition (second ink composition) with a smaller amount of solid content is greater than the amount of an organic solvent in an ink composition (first ink composition) with a larger content of solid content.

The invention may be performed as follows.

[1] According to an aspect of the invention, there is provided an ink set including: a first ink composition; and a second ink composition, in which the first ink composition and the second ink composition are water-based ink jet ink compositions that contain solid content including coloring materials and organic solvents, a content of the solid content in the first ink composition is greater than a content of the solid content in the second ink composition by 5% by mass or greater, a content of the organic solvent in the second ink composition is greater than a content of the organic solvent in the first ink composition by 7% by mass or greater, and the ink set is used in an ink jet recording method that is performed by causing ink to adhere to a heated recording medium.

Stated another way, according to an aspect of the invention there is provided an ink set for ink jet recording that adheres ink to a heated recording medium, the ink set includes: a first water-based ink composition containing a first solid content including a first coloring material and a first organic solvent; and a second water-based ink composition containing a second solid content including a second coloring material and a second organic solvent, wherein there is 5% by mass or more of the first solid content in the first ink composition than the second solid content in the second ink composition, and there is 7% by mass or more of the second organic solvent in the second ink composition than the first organic solvent in the first ink composition.

Here, "a first coloring material" means a coloring material contained in the first water-based ink composition. "A second coloring material" means a coloring material contained in the second water-based ink composition. The first coloring material and the second coloring material may be coloring materials of the same genus, or they may be coloring materials of different genus. "A first organic solvent" means an organic solvent contained in the first water-based ink composition. "A second organic solvent" means an organic solvent contained in the second water-based ink composition. The first organic solvent and the second organic solvent may be organic solvents of the same genus, or they may be organic solvents of different genus. "A first solid content" means a solid content contained in the first water-based ink composition. "A second solid content" means a solid content contained in the second water-based ink composition. The first solid content and the second solid content may be solid contents of the same genus, or they may be solid contents of different genus.

[2] In the ink set, the ink set may be used for recording along with a processing solution that includes an aggregating agent for aggregating constituents of the water-based ink jet ink composition, the content of the solid content in the first ink composition may be greater than a content of solid content in the processing solution by 5% by mass or greater, and a content of an organic solvent in the processing solution may be greater than the content of the organic solvent in the first ink composition by 7% by mass or greater.

[3] In the ink set, a difference between a content of water in the first ink composition and a content of water in the second ink composition may be within 8% by mass.

[4] In the ink set, a difference between a viscosity of the first ink composition and a viscosity of the second ink composition at 20° C. may be within 1.5 mPa·s.

[5] In the ink set, the content of water in the first ink composition and the content of water in the second ink composition may each be equal to or greater than 50% by mass.

[6] In the ink set, the content of the solid content in the first ink composition may be greater than the content of the solid content in the second ink composition by 5 to 13% by mass, and the content of the organic solvent in the second ink composition may be greater than the content of the organic solvent in the first ink composition by 7 to 17% by mass.

[7] In the ink set, the first ink composition may contain 10 to 22% by mass of solid content and 15 to 27% by mass of organic solvent, and the second ink composition may contain 5 to 12% by mass of solid content and 23 to 38% by mass of organic solvent.

[8] In the ink set, the first ink composition may be a white color ink composition that includes a white color coloring material as the solid content, and the second ink composition may be a non-white color ink composition that includes a non-white color coloring material as the solid content.

[9] In the ink set, the content of the organic solvent in the second ink composition may be greater than the content of the organic solvent in the first ink composition by 9% by mass or greater.

[10] According to another aspect of the invention, there is provided an ink jet recording method that is performed using the ink set according to [1] to [9], the method including: causing the first ink composition and the second ink composition to adhere to the heated recording medium.

[11] In the ink jet recording method, a surface temperature of the recording medium when the first ink composition and the second ink composition may be caused to adhere is from 30 to 50° C.

[12] The ink jet recording method may further include: causing a processing solution that includes an aggregating agent for aggregating constituents of the water-based ink jet ink composition to adhere to the recording medium.

[13] In the ink jet recording method, the causing of the ink compositions to adhere may be performed by performing a main scanning, in which the ink compositions are ejected while relative positions of an ink jet head provided with the ink set and the recording medium is changed in a main scanning direction, a plurality of times, and a maximum time of the main scanning performed once is equal to or greater than 0.8 seconds.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

Figure 1:
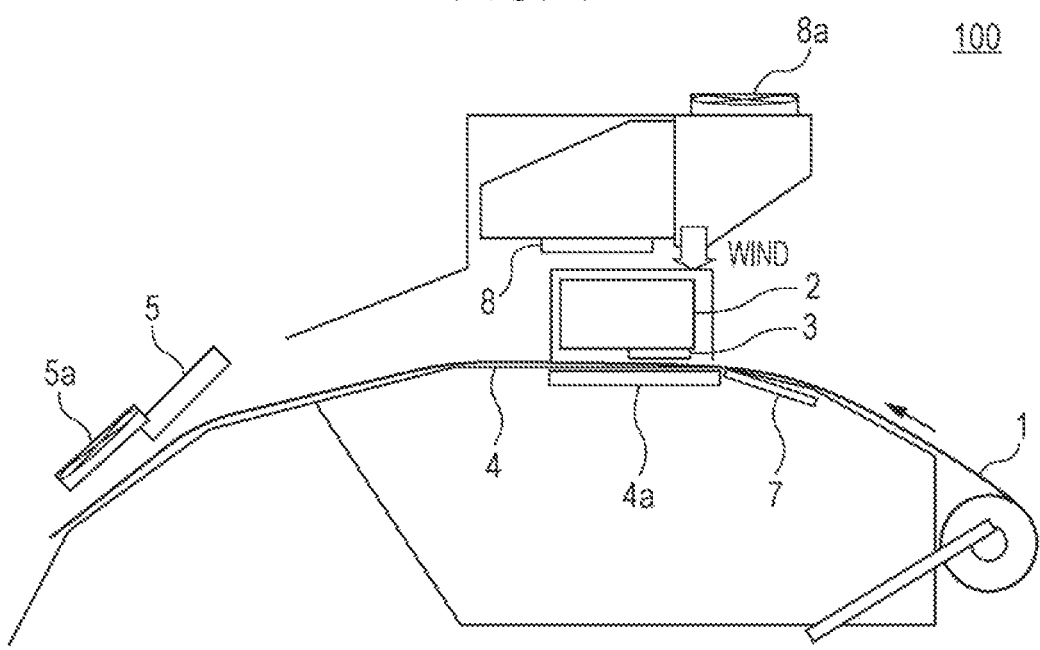
FIG. 1 is a schematic view of an ink jet apparatus that is used in an ink jet recording method according to an embodiment.

Hereinafter, although an embodiment of the invention (hereinafter, referred to as "the embodiment") will be described later with reference to the drawings, the invention is not limited thereto, and various modifications can be made without departing from the gist thereof. Note that the same reference numerals will be used to identify the same elements in the drawings and repeated description will be omitted. In addition, positional relationships, such as an upper side, a lower side, a left side, or a right side, are on the basis of the positional relationships illustrated in the drawings unless otherwise particularly indicated. Further, dimensional ratios in the drawings are not limited to the ratios illustrated in the drawings.

Ink Set

An ink set according to an embodiment includes a first ink composition and a second ink composition. Each of the first ink composition and the second ink composition is a water-based ink jet ink composition that contains solid content including a coloring material and an organic solvent. The content of the solid content in the first ink composition is greater than the content of the solid content in the second ink composition by 5% by mass or greater. The content of the organic solvent in the second ink composition is greater than the content of the organic solvent in the first ink composition by 7% by mass or greater. The ink set is used in an ink jet recording method that is performed by causing ink to adhere to a heated recording medium.

The water-based composition is a composition that contains water as one of the main solvent constituents of the composition, and the content of water in the composition is preferably equal to or greater than 40% by mass. The ink jet ink composition is an ink composition that is used in a recording method based on the ink jet method. The first ink composition and the second ink composition can independently employ constituents and properties as will be described later. Hereinafter, the constituents included in the ink according to the embodiment will be described in detail. Note that in the following description, the first ink composition and the second ink composition will simply be referred to as ink compositions in a case in which it is not necessary to distinguish the ink compositions. Note that in a case of simply referring to the first ink composition (also referred to as first ink) or the second ink composition (also referred to as second ink), this means that these ink compositions are just distinguished and does not intend to limit the constituents, characteristics, and the like of these ink compositions.

The first ink composition and the second ink composition contain solid content that includes coloring materials and organic solvents. Preferably, the first ink composition is a white color ink composition that includes a white color coloring material as the solid content, and the second ink composition is a non-white color ink composition that includes a non-white color coloring material as the solid content. The non-white color coloring material indicates a coloring material other than the white color coloring material.

As for the first ink composition and the second ink composition, the first ink composition may be an ink composition other than the white color ink composition, and the second ink composition may be an ink composition other than the non-white color ink composition. For example, the first ink may be a colored ink with which it is possible to record a certain color, and the second ink may be a colored ink with which it is possible to record a certain color. Even in this case, it is possible to suppress positional deviation between an image recorded with the first ink and an image recorded with the second ink. Preferably, the first ink is a colored ink with which it is possible to record a certain color, and the second ink is a colored ink with which it is possible to record another certain color.

Even in such cases, it is possible for the first ink and the second ink respectively different in content of solid content and organic solvents and to have different compositions in accordance with the respective functions and the like, by the content of the solid content in the first ink composition being greater than that in the second ink composition by 5% by mass or greater and the content of the organic solvent in the second ink composition being greater than that in the first ink composition by 7% by mass or greater. With such first ink and second ink, it is possible to suppress positional deviation between the image recorded with the first ink and the image recorded with the second ink. The colored ink compositions are ink compositions that are used to color a recording medium.

Among the examples of the first ink composition and the second ink composition, it is preferable that the first ink composition be a white color ink composition and the second ink composition is a non-white color ink composition. This is preferable since it is possible to obtain the first ink as white color ink with excellent whiteness and to suppress positional deviation between images in a case in which a white color image and a non-white color image are recorded in an overlapping manner.

The white color ink composition is ink with which it is possible to record a color that is generally called "white" from common sense and includes ink that has slightly been colored. Also, the white color ink composition includes ink that is called and sold with a name such as "white (color) ink or white ink" or the like. Alternatively, the white color ink composition includes ink with brightness ($L^*$) and color levels ($a^*$, $b^*$) of a recorded product that satisfy the ranges $60 \leq L^* \leq 100$, $-4.5 \leq a^* \leq 2$, and $-10 \leq b^* \leq 2.5$ in a case in which recording is performed with such an amount of ink that a surface of a recording medium made of a transparent film is sufficiently covered, for example, and in a case in which the brightness ($L^*$) and the color levels ($a^*$, $b^*$) are measured using a spectrophotometric device in accordance with CIELAB. Examples of the recording medium made of a transparent film include LAG jet E-1000ZC (manufactured by Lintec Corporation). Examples of a spectrophotometer include a spectrophotometric device Spectrolino (name of product manufactured by GretagMacbeth), and examples of measurement include measurement under settings in which a measurement condition is set to a D50 light source, an observation field of view is set to 2°, concentration is set to DIN NB, a white color reference is set to Abs, a filter is set to No, and a measurement mode is set to Reflectance.

The non-white color ink composition is colored ink that is not a white color ink composition and is ink with it is possible to record a color that is called with a color name that is not "white" in a common sense. The non-white color ink composition preferably includes a non-white color coloring material.

Hereinafter, specific materials of the coloring material will be described.

Coloring Material

Although a pigment or a dye can be used as the coloring material, the pigment is preferably used. Although the pigment is not particularly limited, examples thereof include the following examples.

White Color Coloring Material

Examples of the white color coloring material include a white color dye and a white color pigment (white pigment), and the latter is preferably used. Although the white pigment is not particularly limited, examples thereof include inorganic white color pigments such as C.I. Pigment White 6, 18, and 21, titanium oxide, zinc oxide, zinc sulfide, antimony oxide, magnesium oxide, and zirconium oxide. A metal compound pigment is preferably used, and a metal oxide pigment is more preferably used. Organic white color pigments such as white color hollow resin particles and polymer particles can also be used in addition to the inorganic white color pigments.

Non-White Color Coloring Material

Examples of the non-white color coloring material includes coloring materials other than the aforementioned white color coloring materials. Examples thereof include a non-white color dye and a non-white color pigment, and the latter is preferably used. Although the coloring materials of the following respective colors are exemplified, the non-white color coloring material is not limited thereto. Coloring materials of chromatic colors are exemplified.

Although a black pigment is not particularly limited, examples thereof include No. 2300, No. 900, MCF88, No. 33, No. 40, No. 45, No. 52, MA7, MA8, MA100, No. 2200B and the like (all of which are manufactured by Mitsubishi Chemical Corporation), Raven 5750, Raven 5250, Raven 5000, Raven 3500, Raven 1255, Raven 700, and the like (all of which are manufactured by Carbon Columbia), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (manufactured by CABOT JAPAN K.K.), Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4 and the like (all of which are manufactured by Degussa).

Although a pigment that is used in yellow ink is not particularly limited, examples thereof include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Although a magenta pigment is not particularly limited, examples thereof include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245, and C.I. Pigment Violet 19, 23, 32, 33, 36, 38, 43, and 50.

Although a cyan pigment is not particularly limited, examples thereof include C.I. Pigment Blue 1, 2, 3, 15, 15:1, 15:2, 15:3, 15:34, 15:4, 16, 18, 22, 25, 60, 65, and 66, and C.I. Vat Blue 4 and 60.

Although pigments that are used in color ink other than magenta, cyan, and yellow ink are not particularly limited, examples thereof include C.I. Pigment Green 7 and 10, C.I. Pigment Brown 3, 5, 25, and 26, C.I. Pigment Orange 1, 2, 5, 7, 13, 14, 15, 16, 24, 34, 36, 38, 40, 43, and 63.

Although a pearl pigment is not particularly limited, examples thereof include a pigment that has pearly glossiness or interference glossiness, such as titanium dioxide coated mica, argentine, or bismuth oxychloride.

Although a metallic pigment is not particularly limited, examples thereof include particles of aluminum, silver, gold, platinum, nickel, chromium, tin, zinc, indium, titanium, or copper alone of alloy thereof.

The content of the pigment is preferably from 0.1 to 20% by mass, is more preferably from 0.3 to 15% by mass, and is further preferably from 0.4 to 12% by mass, is more preferably from 1 to 8% by mass, and is further preferably from 2 to 5% by mass with respect to 100% by mass of the ink composition.

The content of the coloring material in the first ink is preferably from 2 to 20% by mass, is more preferably from 4 to 15% by mass, and is further preferably from 7 to 13% by mass. The content of the coloring material in the second ink is preferably from 0.1 to 7% by mass, is preferably from 0.5 to 6% by mass, and is further preferably from 1 to 5% by mass. The content of the coloring material in the first ink is preferably greater than that in the second ink, is more preferably greater than that in the second ink by 2 to 15% by mass, and is further preferably greater than that in the second ink by 3 to 12% by mass.

Resin

The first ink composition and the second ink composition may include resin as the solid content. In this manner, it is possible to improve fixability and abrasion resistance of images. The first ink composition and the second ink composition more preferably include resin particles. The resin particles can be used in the form of resin emulsions or the like.

Although the type of resin is not particularly limited, examples thereof include (meth)acrylic acid, (meth)acrylic acid ester, acrylonitrile, cyanoacrylate, acryl amide (all of which will be referred to as acrylic monomers), a single polymer or a copolymer of olefin, styrene, vinyl acetate, vinyl chloride, vinyl alcohol, vinyl ether, vinyl pyrrolidone, vinyl pyridine, vinyl carbazole, vinyl imidazole, and vinylidene chloride, fluorine resin, natural resin, urethane resin, and polyester resin.

Resin that uses at least an acrylic monomer as a constituent thereof (a monomer constituent used to polymerize resin) is regarded as acrylic resin. The acrylic resin may be a copolymer of an acrylic monomer and a monomer other than the acrylic monomer. The acrylic resin is a single polymer or a copolymer that uses at least the acrylic monomer. Among these examples, a vinyl-acrylic copolymer that uses an acrylic monomer and a vinyl-based monomer is preferably used, a styrene-acryl copolymer that uses styrene from among vinyl-based monomers is more preferably used, and copolymer resin that uses at least styrene and (meth)acrylic acid is further preferably used.

Among the examples of resin, acrylic resin, urethane resin, or polyester resin is preferably used, and the acrylic resin is more preferably used.

Note that the aforementioned copolymer may be in any of forms of a random copolymer, a block copolymer, an alternating copolymer, and a graft copolymer.

Although the aforementioned resin is not particularly limited, the resin can be obtained by a preparation method described below, for example, or a plurality of methods may be combined as desired. Examples of the preparation method include a method of mixing and polymerizing (emulsion polymerization) a polymerization catalyst (polymerization initiator) and a dispersing agent in a monomer of constituents included in desired resin, a method of mixing a solution obtained by dissolving resin with a hydrophilic part in a water-soluble organic solvent in water and then removing the water-soluble organic solvent through distillation, and a method of mixing a solution obtained by dissolving resin in a non-water-soluble organic solvent in an aqueous solution along with a dispersing agent.

The content of the resin is preferably equal to or greater than 1% by mass and equal to or less than 15% by mass, and is more preferably equal to or greater than 2% by mass and equal to or less than 10% by mass, and is further preferably equal to or greater than 3% by mass and equal to or less than 7% by mass. By setting the content of the resin within the aforementioned range, it is possible to improve abrasion resistance, to stably dissolve the resin, and to improve ejection stability.

Wax

The first ink composition and the second ink composition may contain a wax as solid content. There is a probability that resin particles are aggregated and fixed with evaporation of moisture, this leads to clogging of nozzles in the recording head, and stable ejection is prevented, in a case in which a recording head is heated. Meanwhile, if the wax is used together, aggregation of polymer particles when the moisture is evaporated is suppressed. In this manner, it is possible to suppress ejection failure and clogging due to the fixation of the resin particles to the nozzles of the recording head and thus to obtain an ink composition with excellent recording stability. Also, the wax prevents a coated film of the resin particles from becoming excessively brittle during high-temperature recording. Therefore, an ink composition with abrasion resistance that tends not to be degraded even at the time of high-temperature recording is obtained.

A melting point of the wax is equal to or greater than 70° C. and less than 110° C. and is more preferably equal to or greater than 80° C. and equal to or less than 110° C. If the melting point falls with the aforementioned range, it is possible to obtain a recorded product with more excellent recording stability and abrasion resistance that tends not to be degraded even at the time of high-temperature recording. Note that the melting point can be measured by a differential scanning calorimeter (DSC). The melting point of the wax can be controlled by adjusting a ratio of a plurality of constituent units that are included in the wax, for example.

The wax preferably contains a polyethylene wax. Although the polyethylene wax with a melting point of equal to or greater than 70° C. and less than 110° C. is not particularly limited, examples thereof include AQUACER 515 polyolefin wax (manufactured by BYK), Nopcote PEM-17 (manufactured by San Nopco), Polylon L787 and Polylon L788 (all of which are manufactured by Chukyo Yushi), and Chemipal W4005 (manufactured by Mitsui Chemicals). The polyethylene wax with a melting point of equal to or greater than 70° C. and less than 110° C. may be synthesized by an ordinary method.

One kind of wax may be used alone, or two or more kinds of waxes may be used in combination.

The amount of the wax added in the ink compositions is preferably from 0.1 to 5.0% by mass, is more preferably from 0.3 to 3.5% by mass, and is further preferably from 1.0 to 2.0% by mass with reference to the total mass of the ink compositions. If the amount of addition falls within the aforementioned range, excellent recording stability is achieved, and abrasion resistance further tends not to be degraded even at the time of high-temperature recording.

Organic Solvent

The first ink composition and the second ink composition contain organic solvents and preferably contain organic solvents with standard boiling points of 180 to 250° C. In this manner, it is possible to prevent the organic solvents contained in the ink compositions in the head from being volatilized and to prevent the nozzles from clogging. Also, it is possible to quickly volatilize the organic solvents when the organic solvents are mixed with the ink compositions on the recording medium and to obtain sufficient image quality on a recording medium.

As the aforementioned organic solvent, a nitrogen-containing solvent may be contained. In this manner, it is possible to stably dissolve the resin in the ink composition. Also, the nitrogen-containing solvent has an effect that softening of resin particles contained in the ink composition is prompted, and adhesiveness tends to be improved even in a case in which a heating temperature is low.

Although the nitrogen-containing solvent is not particularly limited, examples thereof include a pyrrolidone-based solvent, an imidazolidinone-based solvent, an amide ether-based solvent, a pyridone-based solvent, a pyrazine-based solvent, and a pyridine-based solvent. The pyrrolidone-based solvent is preferably used, and examples thereof include 2-pyrrolidone, N-methyl-2-pyrrolidone, and N-ethyl-2-pyrrolidone. One kind of nitrogen-containing solvents may be used alone, or two or more kinds of nitrogen containing solvents may be used together. Among the examples of the nitrogen-containing solvent, an amide-based solvent is preferably used. Examples of the amide-based solvent include cyclic amides and acyclic amides. Examples of the cyclic amides include a pyrrolidone-based amide. Examples of the acyclic amides include an amide ether-based solvent with an acyclic structure.

A solvent called alkoxy alkyl amide is exemplified as the amide ether-based solvent, and examples thereof include 3-methoxy-N,N-dimethylpropionamide, 3-methody-N,N-diethyl pripyonamide, 3-methoxy-N,N-methyl ethyl propionamide, 3-ethoxy-N,N-dimethyl pripyonamide, 3-ethoxy-N,N-diethyl propionamide, 3-ethoxy-N,N-methyl ethyl propionamide, 3-n-butoxy-N,N-dimethyl propionamide, 3-n-butosy-N,N-diethyl propionamide, 3-n-butoxy-N,N-methyl ethyl propionamide, 3-n-propoxy-N,N-dimethyl propionamide, 3-n-propoxy-N,N-diethyl propionamide, 3-n-propoxy-N,N-methyl ethyl propionamidem, 3-iso-propoxy-N,N-dimethyl propionamide, 3-iso-propoxy-N,N-diethyl propionamide, 3-iso-propoxy-N,N-methyl ethyl propionamide, 3-tert-butoxy-N,N-dimethyl propionamide, 3-tert-butoxy-N,N-diethyl propionamide, and the like.

The aforementioned organic solvent may further contain an organic solvent other than the nitrogen-containing solvent. Preferable examples of such an organic solvent include a polyol compound, an alkanediol compound, and a glycol ether compound. Examples of the polyol compound include polyol of alkane that contains four or less carbon atoms and intermolecular condensates of hydroxyl groups of polyol of alkane that contains four or less carbon atoms. The number of carbon atoms is preferably equal to or less than three. The number of condensed molecules in the intermolecular condensates is preferably two to four. The number of hydroxyl groups is equal to or greater than two and is preferably from two to four.

Examples of the alkanediol compound include diolation products of alkane that contains five or more carbon atoms. The number of carbon atoms is preferably equal to or greater than five and equal to or less than ten and is more preferably equal to or less than seven.

Examples of the glycol ether compound include alkanediol in which one or more hydroxyl group is etherized, examples of ether include alkyl ether and allyl ether, and the former is preferably used.

Although examples of the aforementioned organic solvents and other organic solvents are not particularly limited, specific examples thereof include alcohols or glycols such as ethylene glycol, diethylene glycol, triethylene glycol, propylene glycol, dipropylene glycol, 1,3-propanediol, 1,2-butanediol, 1,2-pentanediol, 1,2-hexanediol, 1,3-butanediol, 1,4-butanediol, 1,5-pentanediol, 1,6-hexanediol, 3-methyl 1,3-hexanediol, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol monobutyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, dipropylene glycol mono-iso-propyl ether, methanol, ethanol, n-propyl alcohol, iso-propyl alcohol, n-butanol, 2-butanol, tert-butanol, iso-butanol, n-pentanol, 2-pentanol, 3-pentanol, tert-pentanol, and 2-methyl-1,3-propanediol. One kind of other solvents may be used alone, or two or more kinds of other solvents may be used in combination.

The content of the organic solvent is preferably equal to or greater than 3.0% by mass, is more preferably equal to or greater than 5.0% by mass and equal to or less than 37% by mass, is further preferably equal to or greater than 10% by mass and equal to or less than 35% by mass, and is further preferably equal to or greater than 15% by mass and equal to or less than 30% by mass with respect to the total amount of the ink composition. In this manner, it is possible to quickly volatilize the organic solvent on the recording medium and to obtain sufficient image quality on the recording medium.

Among the organic solvents, the content of the nitrogen-containing solvent is preferably equal to or greater than 3% by mass, is more preferably equal to or greater than 5.0% by mass and equal to or less than 27% by mass, is further preferably equal to or greater than 10% by mass and equal to or less than 25% by mass, and is further preferably equal to or greater than 15% by mass and equal to or less than 20% by mass with respect to the total amount of the ink composition. This is preferable in terms of more excellent abrasion resistance and the like.

The content of the organic solvent of the polyol compound with the standard boiling point of greater than 280° C. in the ink composition is preferably equal to or less than 2% by mass, is more preferably equal to or less than 1% by mass, is further preferably equal to or less than 0.5% by mass, is particularly preferably equal to or less than 0.1% by mass, and is yet further preferably equal to or less than 0.05% by mass with respect to the total amount of the ink composition. The lower limit of the content is 0% by mass. If the content falls within the aforementioned range, degradation of abrasion resistance of a recorded product using the ink composition due to the organic solvent with the standard boiling point of greater than 280° C. is suppressed, and it is possible to obtain an excellent recorded product with excellent abrasion resistance.

Further, in the first ink composition and the second ink composition, the content of the organic solvent (not limited to the polyol compound) with a standard boiling point of greater than 280° C. is preferably equal to or less than 5% by mass and more preferably falls within the aforementioned range. Although examples of the organic solvent with the standard boiling point of greater than 280° C. is the polyol compound, the organic solvent is not limited thereto. If the content of the organic solvent in the ink composition falls within the aforementioned range, dryness of the ink on the recording medium is not significantly degraded, and as a result, it is possible to reduce density irregularity of an image and to achieve ink fixability on various recording media, particularly, on an ink non-absorbable or low-absorbable recording medium.

Surfactant

The first ink composition and the second ink composition preferably contain a surfactant. Although the surfactant is not particularly limited, examples thereof include an acetylene glycol-based surfactant, a fluorine-based surfactant, and a silicone-based surfactant. Among the examples, the acetylene glycol-based surfactant and the silicone-based surfactant are preferably used.

The content of the surfactant is preferably from 0.1 to 2.0% by mass, is more preferably from 0.1 to 1.7% by mass, and is further preferably from 0.1 to 1.5% by mass with respect to 100% by mass of the ink composition. If the content of the surfactant is equal to or less than 2.0% by mass, abrasion resistance tends to be further improved. Also, if the content of the surfactant is equal to or greater than 0.1% by mass, filling properties of the obtained recorded product are further improved, and ejection stability tends to be further improved.

Water

The first ink composition and the second ink composition contain water. Examples of water include ion include pure water such as ion-exchanged water, ultrafiltrated water, reverse osmosis water, and distilled water and ultrapure water from which ionic impurities have been removed as much as possible. If water sterilized by performing ultraviolet irradiation, adding hydrogen peroxide, or the like is used, it is possible to prevent mold or bacteria from being generated in a case in which a pigment dispersion and ink using the pigment dispersion are stored for a long period of time.

Although the content of water is not particularly limited, the content of water is preferably larger than the content of the organic solvent in the invention. The ink is so-called "water-based ink", and at least water is contained as a main constituent in solvent constituents contained in the ink. The content of water is preferably from 40 to 95% by mass, is more preferably from 45 to 90% by mass, and is further preferably from 50 to 80% by mass, and is particularly preferably from 52 to 66% by mass with respect to 100% by mass of the water-based ink composition.

Other Constituents

Various additives such as a solubilizer, a viscosity adjuster, a pH adjuster, an antioxidant, an antiseptic agent, a fungicide, and a corrosion inhibitor in order to satisfactorily maintain storing stability and ejection stability from the head and a chelating agent for capturing metal ions that affect dispersion can be appropriately added to the ink used in the embodiment.

Although the constituents that can be included in the first ink composition and the second ink composition have been described above, the constituents that can be included in the first ink composition and the second ink composition will be defined as follows in order to suppress positional deviation between images formed with the first ink composition and with the second ink composition in the ink jet recording method that is performed by causing the ink to adhere to a heated recording medium in the embodiment.

In the embodiment, the content of the solid content in the first ink composition is greater than that in the second ink composition by 5% by mass or greater, is preferably greater than that in the second ink composition by 5 to 20% by mass, is more preferably greater than that in the second ink composition by 5 to 13% by mass, and is further preferably greater than that in the second ink composition by 6 to 10% by mass. Meanwhile, it is also preferable that the content of the solid content in the first ink composition be greater than that in the second ink composition by 5 to 6.5% by mass in terms of easiness in designing the ink.

The content of the solid content in the first ink is preferably from 7 to 25% by mass, is more preferably from 10 to 22% by mass, is further preferably from 10 to 20% by mass, is further preferably from 12 to 18% by mass, and is particularly preferably from 14 to 18% by mass with respect to the total mass of the ink composition. Further, the content of the solid content in the first ink is preferably from 15 to 18% by mass.

The content of the solid content in the second ink is preferably from 1 to 15% by mass, is more preferably from 2 to 13% by mass, is further preferably from 2 to 12% by mass, is yet further preferably from 5 to 11% by mass, and is particularly preferably from 8 to 11% by mass with respect to the total mass of the ink composition. Further, the content of the solid content in the second ink is preferably from 9 to 11% by mass. It is preferable that the content of the solid content in the second ink fall within the aforementioned range since it is possible to achieve more excellent abrasion resistance, clogging resistance, and the like.

The content of the solid content in the ink composition means content of constituents that are not evaporated and volatilized in the secondary drying process that is a post-drying process. Although at least the coloring material is included in the solid content of the ink composition, resin particles, a wax, and the like may further be included.

Although the content of the organic solvent in the ink composition is content of the aforementioned organic solvent such as the nitrogen-containing solvent, the content of the surfactant is not included therein.

In addition, the content of the organic solvent in the second ink composition is greater than that in the first ink composition by 7% by mass, is preferably greater than that in the first ink composition by 7 to 20% by mass, is more preferably greater than that in the first ink composition by 8 to 17% by mass, and is further preferably greater than that in the first ink composition by 9 to 14% by mass. The content of the organic solvent in the second ink composition is particularly preferably greater than that in the first ink composition by 9% by mass or greater, is more preferably greater than that in the first ink composition by 10% by mass or greater, is further preferably greater than that in the first ink composition by 12% by mass, and is further preferably greater than that in the first ink composition by 12 to 14% by mass.

The content of the organic solvent in the first ink is preferably from 5 to 27% by mass, is more preferably from 5 to 26% by mass, is further preferably from 12 to 25% by mass, is further preferably from 10 to 24% by mass, and is particularly preferably from 15 to 23% by mass.

The content of the organic solvent in the second ink is preferably from 10 to 40% by mass, is more preferably from 20 to 38% by mass, is further preferably from 23 to 35% by mass, is particularly preferably from 25 to 33% by mass, is more particularly preferably from 28 to 33% by mass.

If the amounts of the solid content and the amounts of the organic solvents in the first ink composition and the second ink composition are balanced by employing the compositions in which the content of the organic solvent in the second ink composition is greater than that in the first ink composition in this manner, it is possible to suppress occurrence of positional deviation between images as will be shown below in the examples which will be described later. In particular, it is possible to suppress an increase in the positional deviation between the image of the first ink composition and the image of the second ink composition during the pass. It has been discovered that the degrees of the positional deviation of the image of the first ink composition and the positional deviation of the image of the second ink composition are adjusted with such compositions even if the drying of the ink at the nozzles advances during the pass.

The principle thereof is estimated as follows. It is estimated that the ink is dried at the nozzles, the viscosity increases, this changes the ejection speed and the ejection timing, ink landing positions deviate, and positional deviation between images occurs. It is estimated that the degrees of the landing positional deviation when the ink is dried at the nozzles become closer as the total content of the solid content and the organic solvent in the ink in the first ink becomes closer to that in the second ink. It is estimated to be because the solid content and the organic solvent from among the main constituents in the water-based composition have common points in properties such as viscosity that is higher than that of water and the total content of the solid content and the total content of the organic solvent are close to each other. In a case in which main constituents of the ink are the solid content, the organic solvent, and water, the difference between the content of water in the first ink and the content of water in the second ink becomes relatively small if the total content of the solid content and the organic solvent in the first ink and the total content of the solid content and the organic content in the second ink are balanced. Although water is dried early when the ink is dried at the nozzles, the organic solvent and the solid content are not dried or are relatively slowly dried. Therefore, when the ink is dried at the nozzles, drying of the ink is stopped once and the increase in the viscosity of the ink is also stopped once in a state in which water is substantially dried. In a case in which the content of water in the first ink is close to the content of water in the second ink, the drying rates of the ink in this state become closer. This is because the ink is dried by the content of water. It is estimated that the degrees of increase in the viscosity become closer by the drying being stopped once in this state. However, the above description is just estimation, and the principle is not limited thereto.

A difference (large-small) between a content of water in the first ink composition and a content of water in the second ink composition is preferably within 8% by mass, is further preferably within 5.5% by mass, and is further preferably within 3% by mass. The lower limit of the difference of the content of water is equal to or greater than 0% by mass. Meanwhile, the difference is preferably equal to or greater than 2% by mass and is more preferably equal to or greater than 5% by mass in terms of easiness in designing the ink.

The content of water in the first ink is preferably greater than the content of water in the second ink within the aforementioned range though the embodiment is not limited thereto. By adjusting the content of water in this manner, it is possible to adjust the degrees of dryness of the ink, to thus adjust the degrees of increases in viscosity due to the drying, and to suppress positional deviation between the images.

The difference between the viscosity of the first ink composition and the viscosity of the second ink composition (high-low) at 20° C. is preferably within 2 mPa·s, is more preferably within 1.5 mPa·s, is further preferably within 1 mPa·s, and is particularly preferably within 0.5 mPa·s. The lower limit thereof is equal to or greater than 0 mPa·s. The viscosity of the first ink composition is preferably lower than that of the second ink composition within the aforementioned range of the difference of the viscosity. If the difference between the initial viscosity of the first ink composition and the initial viscosity of the second ink composition is small in this manner, an increase in the difference of the viscosity tends to be small when the ink is dried and the viscosity increases. Note that even in the case in which the initial viscosity of the first ink composition and the initial viscosity of the second ink composition are not adjusted, it is possible to adjust the positions of initial images by changing the drive waveforms of the heads for the respective ink compositions or tuning the image recording start positions. Therefore, although the difference of the initial viscosity is not necessarily to be small, it is possible to suppress the increase in the positional deviation between the images during the pass by employing such first ink and second ink that satisfy the conditions that the content of the solid content in the first ink composition is greater than that in the second ink composition by 5% by mass or greater and the content of the organic solvent in the second ink composition is greater than that in the first ink composition by 7% by mass. For example, it is possible to prevent drying of the ink at the nozzles during recording, increase in the viscosity, and gradual increase in the positional deviation between the images. The viscosity of the ink can be measured using a rotation-type rheometer. For example, an MCR rheometer (manufactured by Anton Paar) or the like can be used. The viscosity can be measured by keeping the temperature of the ink at 20° C.

The content of water in the first ink composition and the content of water in the second ink composition is each preferably equal to or greater than 50% by mass. The embodiment is particularly effective in a case in which the content of water in the ink compositions is as large as 50% by mass or greater.

The first ink composition preferably contains 10 to 22% by mass of the solid content and 10 to 27% by mass of the organic solvent. Further, the first ink composition more preferably contains 12 to 20% by mass of the solid content and 12 to 26% by mass of the organic solvent and further preferably contains 14 to 20% by mass of the solid content and 15 to 24% by mass of the organic solvent.

In addition, the second ink composition preferably contains 5 to 15% by mass of the solid content and 23 to 38% by mass of the organic solvent, more preferably contains 5 to 11% by mass of the solid content and 25 to 37% by mass of the organic solvent, and further preferably contains 8 to 11% by mass of the solid content and 25 to 35% y mass of the organic solvent. In this manner, it is possible to suppress positional deviation between the image of the first ink composition and the image of the second ink composition during the ink jet recording by balancing the amounts of the solid content and the amounts of the organic solvents in the first ink composition and the second ink composition by increasing the content of the organic solvent in the second ink composition than that in the first ink composition in accordance with the amount by which the content of the solid content in the first ink composition is greater than that in the second ink composition.

Processing Solution

The ink set according to the embodiment is preferably used for recording along with a processing solution that includes an aggregating agent for aggregating the constituents of the water-based ink jet ink composition. The processing solution is a water-based composition that includes water as one of the main solvent constituents of the composition, and the content of water in the composition is preferably equal to or greater than 40% by mass. The processing solution may further contain an organic solvent. It is possible to achieve excellent image quality and the like of the ink compositions using the processing solution. Meanwhile, abrasion resistance of the image may be degraded. The reason is estimated to be because the constituents of the ink are aggregated with the processing solution and an ink film tends not to be smoothed. The processing solution is preferably caused to adhere (applied) to the recording medium before the ink compositions are caused to adhere (applied). It is possible to improve image quality as compared with the ink compositions are caused to adhere directly to the recording medium by coating the recording medium with the processing solution in advance. Physical properties such as containing of constituents that may be included in addition to the aggregating agent and the content and the properties of the constituents of the processing solution that are similar to those in relation to the aforementioned ink compositions can be employed independently from those in the ink composition. In particular, the physical properties that are similar to those of the second ink can be employed. The processing solution is preferably not used to color the recording medium, the content of the coloring material in the processing solution is preferably equal to or less than 0.1% by mass and is more preferably equal to or less than 0.05% by mass, and the lower limit is equal to or greater than 0% by mass. Although the constituents in the processing solution will be described below, the constituents are not limited to the constituents listed below as described above.

Aggregating Agent

The aggregating agent has a function of aggregating any of the constituents included in the ink compositions, preferably, either the coloring material or the resin by reacting with it, increasing the viscosity, fixing the resin or the coloring material included in the ink compositions on the recording medium early, and suppressing flowing thereof. In this manner, it is possible to fix ink droplets after landing, to suppress interference between the ink droplets, and to form an image within density irregularity.

Any one of polyvalent metal salts, organic acids, and cationic polymers is preferably used, any one of polyvalent metal salts and cationic polymers is more preferably used, and the former is further preferably used as the aggregating agent. The content of the aggregating agent included in the processing solution is preferably from 0.5 to 20% by mass, is more preferably from 1 to 15% by mass, and is further preferably from 2 to 10% by mass. In this manner, it is possible to aggregate the constituents of the colored ink composition and to thus improve image quality.

The polyvalent metal compounds are compounds, each of which is formed with a polyvalent metal ion with a valence of two or more and anion. Examples of the polyvalent metal ion with a valence of two or more include $Ca^{2+}$, $Mg^{2+}$, $Cu^{2+}$, $Ni^{2+}$, $Zn^{2+}$, and $Ba^{2+}$. Examples of anion include $Cl^-$, $No_3^-$, $CH_3COO^-$, $I^-$, $Br^-$, $ClO_3^-$, and $SO_4^-$. Among these examples, a magnesium salt, a calcium salt, and an aluminum salt can preferably be used from the viewpoint that the aforementioned aggregating effect is further enhanced.

Although the organic acids are not limited to those listed below, examples thereof include a succinic acid, an acetic acid, a propionic acid, and a lactic acid.

Although the cationic polymers are not limited to the cationic polymers listed below, and preferable examples include an amine-based polymer. Any amine-based polymer that has an amino group in the structure may be used, and examples thereof include resin generated from epihalohydrin and an amine compound, polyallylamine, and a quaternary salt of polyallylamine. Examples thereof include a cationic polymer that is soluble in water and is positively charged in water.

The content of the aggregating agent in the processing solution is preferably from 0.5 to 15% by mass. The content is more preferably from 1 to 10% by mass and is further preferably from 2 to 8% by mass. The content of the aggregating agent in the processing solution is preferably from 0.1 to 1.5 mol/kg in terms of molar concentration. The lower limit of the content of the aggregating agent in the processing solution is more preferably equal to or greater than 0.2 mol/kg. The upper limit of the content of the aggregating agent in the processing solution is more preferably equal to or less than 1.0 mol/kg and is further preferably equal to or less than 0.6 mol/kg. In this manner, it is possible to keep a satisfactory balance with other properties such as abrasion resistance while improving image quality.

Organic Solvent

The processing solution preferably includes an organic solvent and further preferably includes an organic solvent with a standard boiling point from 180 to 250° C. In this manner, it is possible to prevent the organic solvent included in the processing solution in the head from being volatilized and to prevent nozzle clogging. Also, it is possible to quickly volatilize the organic solvent when the organic solvent is mixed with the ink compositions on the recording medium and to obtain sufficient image quality on the recording medium.

A nitrogen-containing solvent may be included as the aforementioned organic solvent. It is possible to stably dissolve the resin in the ink compositions and to mix the resin with the ink compositions. Also, the nitrogen-containing solvent has an effect of promoting softening of resin particles included in the ink compositions, and adhesiveness tends to be improved even in a case in which the heating temperature is low. The nitrogen-containing solvent and other organic solvents that are similar to those described above for the ink compositions can be used.

The content of the organic solvent is preferably equal to or greater than 3.0% by mass, is more preferably equal to or greater than 5.0% by mass and equal to or less than 35% by mass, is further preferably equal to or greater than 10% by mass and equal to or less than 35% by mass, and is further preferably equal to or greater than 15% by mass and equal to or less than 30% by with respect to the total amount of the processing solution. In this manner, an appropriate degree of aggregation of the constituents of the ink compositions can be achieved when the ink compositions and the processing solution are mixed. Also, it is possible to quickly volatilize the organic solvent when the organic solvent is mixed with the ink compositions on the recording medium and to obtain sufficient image quality on an ink non-absorbable or low-absorbable recording medium.

The content of the organic solvent with the standard boiling point of greater than 280° C. in the processing solution is preferably equal to or less than 2% by mass. Examples of the organic solvent with the boiling point of greater than 280° C. include a polyol compound. If the content of the organic solvent in the processing solution falls within the aforementioned range, the drying properties of the processing solution on the recording medium are not significantly regraded, which is preferable. As a result, excellent reduction of image bleeding and abrasion resistance are achieved on various recording medium, in particular, on an ink non-absorbable or low-absorbable recording medium, which is preferable.

The content of the organic solvent with the standard boiling point of greater than 280° C. in the processing solution is more preferably equal to or less than 1% by mass, is further preferably equal to or less than 0.5% by mass, is particularly preferably equal to or less than 0.1% by mass, and is yet further preferably equal to or less than 0.05% by mass with respect to the total mass of the ink compositions.

The lower limit of the content is 0% by mass. If the content falls within the aforementioned range, degradation of abrasion resistance of a recorded product due to the organic solvent with the standard boiling point of greater than 280° C. is suppressed, and it is possible to obtain a recorded product with more excellent abrasion resistance.

The processing solution may contain other constituents such as a surfactant, resin, a sizing agent (for example, starch substances, cellulose-based substances, polysaccharide, protein, and a water-soluble polymer), a pH adjuster, an antiseptic, and a fungicide.

Although the constituents of the processing solution have been described above, the differences of the content of the solid content and the organic solvents in the first ink composition and the processing solution are preferably defined within aforementioned ranges that are similar to those of the differences of the content of the solid content and the organic solvents in the first ink composition and the second ink composition in the embodiment. Specifically, it is preferable that the content of the solid content in the first ink composition be greater than that in the processing solution by 5% by mass and that the content of the organic solvent in the processing solution be greater than that in the first ink composition by 7% by mass or greater. In this manner, it is possible to suppress the positional deviation between the images during the ink jet recording between the solutions that contain different amounts of solid contents, such as the processing solution and the first ink composition, for reasons that are similar to those described above for the first ink composition and the second ink composition. In particular, this is preferable since it is possible to suppress the positional deviation between the image formed with the first ink and the processing solution layer formed with the processing solution, to bring the first ink into sufficient contact with the processing solution, and to improve image quality.

The content of the solid content in the processing solution is content of the constituents that are not evaporated and volatilized in the secondary drying process at the post-drying process, and the aggregating agent is exemplified as the solid content in the processing solution. In a case in which the processing solution includes constituents that are or may be included in the ink compositions, the constituents are also regarded as the solid content.

In addition, it is preferable that the difference between the content of water in the first ink composition and the processing solution and/or the difference between a viscosity between the first ink composition and the processing solution be defined within the ranges that are similar to those described above in relation to the first ink composition and the second ink composition.

Recording Apparatus

A recording apparatus according to the embodiment is a recording apparatus that performs recording by the recording method according to the embodiment. The recording apparatus may be an ink jet recording apparatus and may be a serial-type ink jet recording apparatus or a line-type ink jet recording apparatus.

Hereinafter, an example of the recording apparatus according to the embodiment will be described.

FIG. 1 illustrates an outline sectional view of an example of the recording apparatus (ink jet apparatus) that is used in the ink jet recording method according to the embodiment. As illustrated in FIG. 1, an ink jet apparatus 100 includes a carriage 2, an ink jet head 3, a platen 4, a platen heater 4a, a post-heater 5, a cooling fan 5a, a pre-heater 7, an IR heater 8, and a ventilation fan 8a. Note that the cooling fan 5a, the pre-heater 7, the IR heater 8, and the ventilation fan 8a are used as desired and can be omitted.

The ink jet head 3 is mounted on the carriage 2 and includes a plurality of nozzle arrays for ejecting the ink compositions. The respective nozzle arrays include a plurality of nozzle holes aligned therein. The ink jet recording apparatus 100 is a so-called serial-type ink jet recording apparatus. The serial-type ink jet recording apparatus means an ink jet recording apparatus in which the ink jet head 3 is mounted on the carriage 2 that moves in a predetermined direction and liquid droplets are ejected onto a recording medium by the ink jet head 3 moving with movement of the carriage 2 in a main scanning direction. The carriage 2 performs main scanning to cause ink to adhere to the recording medium by ejecting the ink from the ink jet head 3 mounted on the carriage 2 while moving in the main scanning direction that corresponds to a front side-further side direction in the drawing. The ink jet head 3 may include a head that ejects the first ink composition and a head that is arranged on the downstream side of the first head and ejects the second ink composition. Alternatively, the ink jet head 3 may be a single head including a nozzle array that ejects the first ink composition and a nozzle array that ejects the second ink composition.

Also, the ink jet head 3 is preferably configured to eject the processing solution as well. In this case, the ink jet head 3 can simply include a head for ejecting the processing solution on the upstream side of the head for ejecting the first ink composition. Alternatively, the ink jet head 3 may include a nozzle for ejecting the processing solution on the upstream side of a nozzle array for ejecting the first ink composition.

The platen heater 4a is used when the recording medium is heated in a process of causing the ink compositions to adhere. It is possible to heat the recording medium on a side opposite to the ink jet head 3 by using the platen heater 4a. In this manner, the ink jet head 3 relatively tends not to be heated.

The post-heater 5 is for secondary-drying and solidifying the ink compositions recorded on a recording medium 1. Moisture and the like contained in the ink composition are quickly evaporated, and a film is formed with polymer particles contained in the ink compositions by the post-heater 5 heating the recording medium 1 on which an image has been recorded. In this manner, an ink dried product is fixed (bonded) to the recording medium, and an image with excellent abrasion resistance and high image quality can be obtained in a short time.

The cooling fan 5a is used to form a coated film with satisfactory adhesiveness on the recording medium by cooling the ink composition on the recording medium after drying the recording medium by the post-heater 5.

The pre-heater 7 is for heating the recording medium in advance (pre-heating) before the ink composition is ejected to the recording medium.

The IR heater 8 is used as desired and is used to heat the recording medium from the side of the ink jet head 3 in the process of causing the ink compositions to adhere. In this manner, the ink jet head 3 is also heated at the same time, and the temperature can be raised without being affected by the thickness of the recording medium as compared with a case in which the heating is performed from the rear surface of the recording medium, such as a case in which the platen heater 4a is used. The ventilation fan 8a is used to more efficiently dry the ink compositions that has adhered to the recording medium 1.

Figure 2:
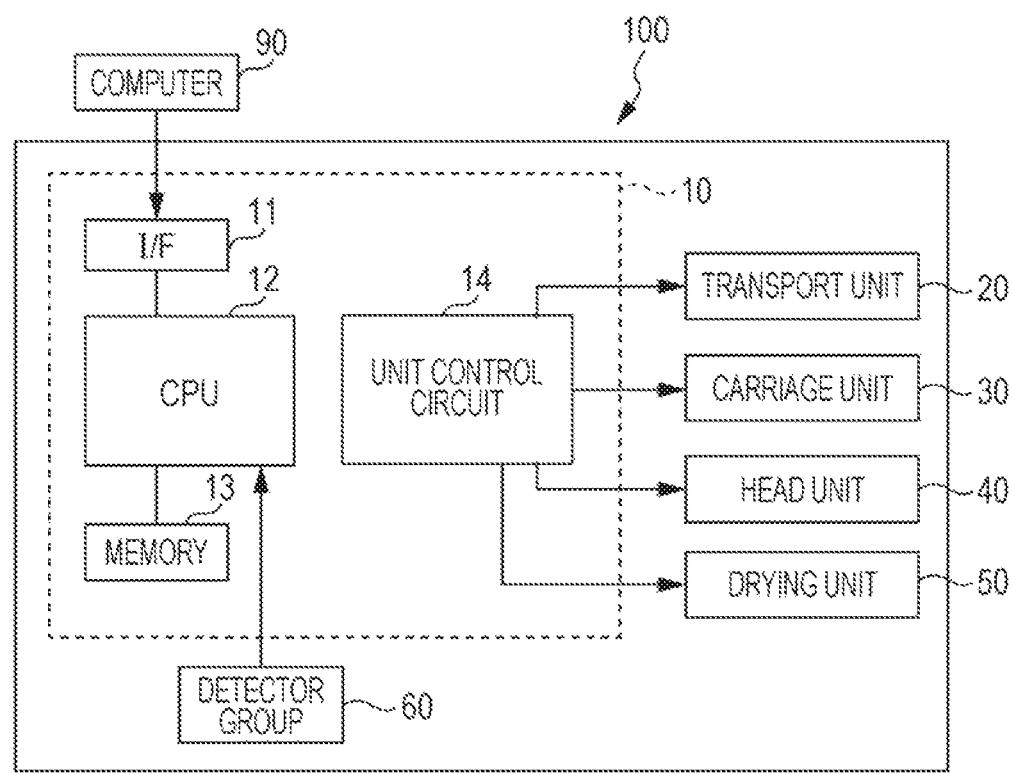
FIG. 2 is a block diagram of the ink jet apparatus that is used in the ink jet recording method according to the embodiment.

FIG. 2 is a functional block diagram of the ink jet recording apparatus 100. The controller 10 is a control unit that performs control of the ink jet recording apparatus 100. An interface unit 11 (I/F) is for transmitting and receiving data between the computer 90 and the ink jet recording apparatus 100. A CPU 12 (processor) is an arithmetic processing device for performing overall control of the ink jet recording apparatus 100. A memory 13 is for securing a region in which a program of the CPU 12 is stored, a working region, and the like. The CPU 12 controls the respective units using a unit control circuit 14. Note that a detector group 60 monitors conditions in the ink jet recording apparatus and the controller 10 controls the respective units on the basis of the detection results.

A transport unit 20 is for controlling sub scanning (transport) of ink jet recording, and specifically, the transport unit 20 controls a transport direction and a transport speed of the recording medium 1. Specifically, the transport direction and the transport speed of the recording medium 1 are controlled by controlling a rotation direction and a rotation speed of a transport roller that is driven by a motor.

A carriage unit 30 is for controlling the main scanning (pass) of ink jet recording, and specifically, the carriage unit 30 is for reciprocating the ink jet head 3 in the main scanning direction. The carriage unit 30 includes the carriage 2 on which the ink jet head 3 is mounted and a carriage moving mechanism for reciprocating the carriage.

The head unit 40 is for controlling the amount of the processing solution or the ink composition ejected from the nozzles of the ink jet head. In a case in which the nozzles of the ink jet head are designed to be driven by piezoelectric elements, for example, operations of the piezoelectric elements in the respective nozzles are controlled. The head unit 40 controls the dot sizes of the processing solution in a time from adhesion of the processing solution to adhesion of the ink. The amount of the processing solution adhering per scanning is controlled depending on a combination of control of the carriage unit 30 and the head unit 40.

A drying unit 50 controls temperatures of various heaters such as the IR heater, the pre-heater, the platen heater, and the post-heater.

The aforementioned ink jet recording apparatus 100 alternately repeats an operation of causing the carriage 2 with the ink jet head 3 mounted thereon to move in the main scanning direction and a transport operation (sub scanning). At this time, the controller 10 controls the carriage unit 30 when each pass is performed, moves the ink jet head 3 in the main scanning direction, controls the head unit 40, causes predetermined nozzle holes of the ink jet head 3 to eject liquid droplets of the processing solution or the ink compositions, and causes the liquid droplets of the ink compositions to adhere to the recording medium 1. The controller 10 controls the transport unit 20 and causes the transport unit 20 to transport the recording medium 1 in the transport direction by a predetermined transport amount during the transport operation.

A recording region to which a plurality of liquid droplets (dots) have been caused to adhere is gradually transported by the pass (main scanning) and the transport operations (sub scanning) being alternately repeated. Then, the liquid droplets that have been caused to adhere to the recording medium are dried by the post-heater 5, thereby completing an image. Thereafter, the completed recorded product may be wound into a roll shape using a winding mechanism (not illustrated) or may be transported by a flatbed mechanism (not illustrated). The main scanning is also referred to as a pass. This is a recording method of a serial type. The main scanning is also referred to as scanning when distinguished from the sub scanning.

Figure 3:
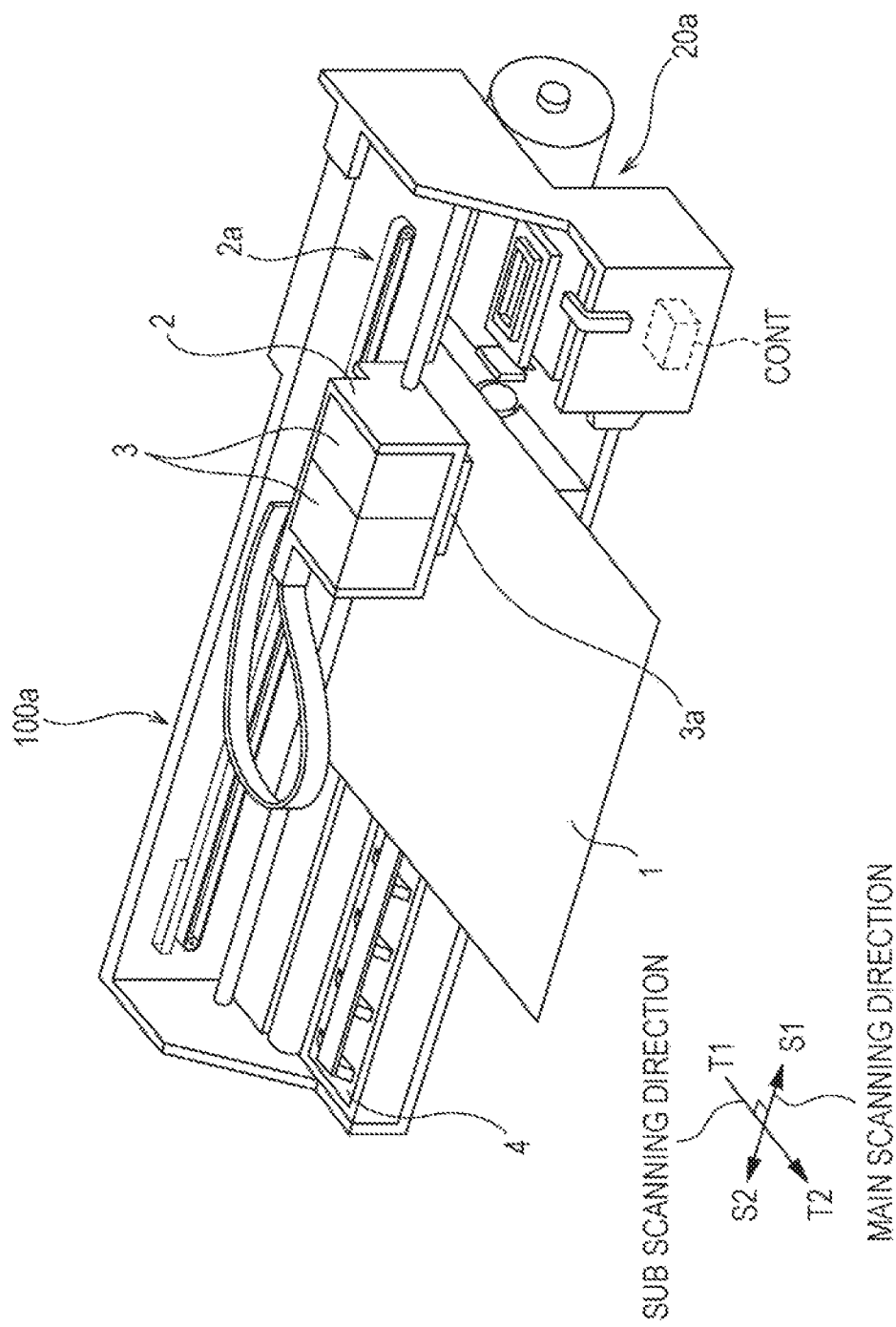
FIG. 3 is a schematic view near a carriage of the ink jet apparatus that is used in the ink jet recording method according to the embodiment.

FIG. 3 is a perspective view illustrating an example of a configuration near the carriage of the recording apparatus in FIG. 1. This is a part of the example of the configuration of the serial-type ink jet recording apparatus. A configuration 100a has a carriage 2, an ink jet head 3 that is mounted on the carriage 2, a member 3a that includes nozzles that are a part of the ink jet head 3 and eject ink, an ink accommodation body (not illustrated), and an ink supply path (not illustrated) such as an ink supply tube that supplies the ink from the ink accommodation body to the ink jet head 3. The ink accommodation body may be provided at a location other than the carriage 2 or may be provided at the carriage. Also, the configuration 100a includes a platen 4, which is disposed below the carriage 2, to which a recording medium P is transported, a carriage moving mechanism 2a that causes the carriage 2 to move relative to the recording medium P, a transport mechanism 20a that is a roller that transports the recording medium P in the sub scanning direction (transport direction), and a control unit CON that controls operations of the carriage 2 and the like. The direction S1-S2 corresponds to the main scanning direction, and the direction T1→T2 corresponds to the sub scanning direction. Note that main scanning is performed on any one sides in the main scanning direction (the left-right direction of the apparatus) in the main scanning performed once.

Figure 4:
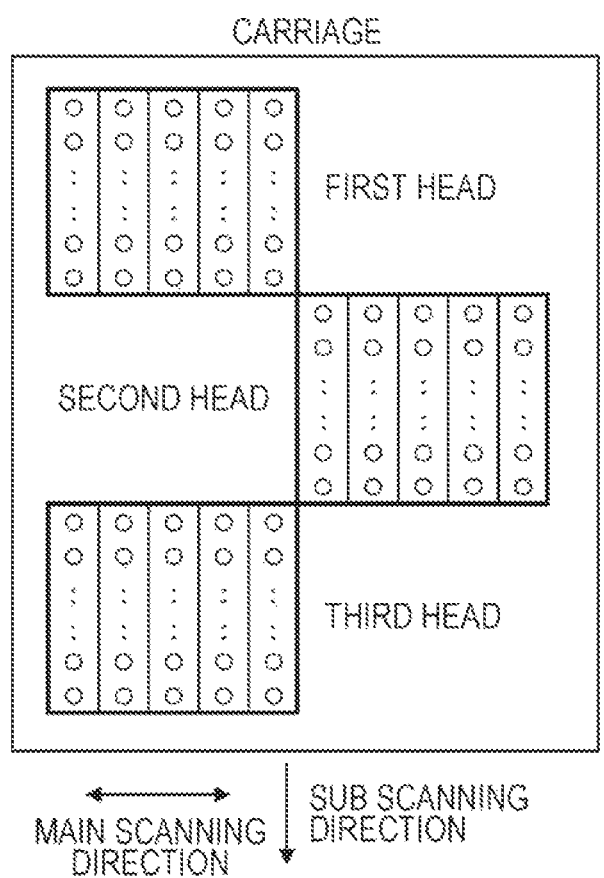
FIG. 4 is an example arrangement of a head (ink jet head) mounted on the carriage of the ink jet apparatus that is used in the ink jet recording method according to the embodiment.

FIG. 4 is a diagram illustrating an example arrangement of heads (ink jet heads) mounted on the carriage of the serial-type recording apparatus. On the carriage, a first head, a second head, and a third head are arranged in this order from the upstream side to the downstream side in the sub scanning direction that is the transport direction of the recording medium. The heads perform main scanning of ejecting the ink while moving in the main scanning direction using the carriage and causing the ink to adhere to the recording medium. The main scanning is performed on any one side in the left-right direction in the drawing in the main canning performed once. The recording medium is gradually transported, and the recording is caused to advance by alternately repeating the main scanning and the sub scanning. The composition with which the nozzle array in the first head is filled is ejected and is caused to adhere to the recording medium through the main scanning. While the main scanning and the sub scanning are alternately repeated, and the recording is caused to advance, then the composition with which the second nozzle array is filled is caused to adhere to the recording medium, and then the composition with which the third nozzle array is filled is caused to adhere to the recording medium.

A region in which the heads move while facing the recording medium in the main scanning performed once is referred to as a recording region of the main scanning. The recording region of the main scanning performed once is a region with a belt shape that has a length in the sub scanning direction corresponding to the nozzle arrays of the heads in the sub scanning direction and that extends in the main scanning direction. In a case in which recording is performed by ejecting a certain composition from one nozzle array of the first head, for example, the recording region of the main scanning performed once with the composition is a region with a belt shape that has a length in the sub scanning direction of the first nozzle array of the first head and that extends in the main scanning direction.

One head includes five nozzle arrays, and it is also possible to fill the respective nozzle arrays with different compositions and to eject the compositions. In this case, the plurality of compositions ejected from one head can be caused to adhere to the recording region of the main scanning in the main scanning performed once. The number of the heads and the number of the nozzle arrays included in each head are not limited to those in the drawing.

Meanwhile, the line-type ink jet recording apparatus may be used as the recording apparatus. In the recording apparatus in FIG. 1, for example, the ink jet head 3 is configured as a line head, which extends in the width direction (the furthest and the closest direction in FIG. 1) of the recording medium, in which the length of the ink jet head in the width direction is equal to or greater than the length of the recording region on the recording medium in the width direction. The position of the line head is fixed during the recording. The recording is performed by performing scanning (main scanning), in which the ink is ejected from the line head and is caused to adhere to the recording medium while the recording medium is transported, once. This is a line-type recording method. It is also possible to perform recording using a plurality of types of compositions by arranging a plurality of line heads from the upstream side to the downstream side in the transport direction of the recording medium and causing the respective line heads to eject different compositions. In a case in which the line-type ink jet recording apparatus is used as the recording apparatus, configurations of the recording apparatus other than the configuration of the ink jet head and the recording method can be similar to those in FIG. 1.

Recording Medium

In the embodiment, a non-absorbable or low-absorbable recording medium is preferably used as the recording medium 1. Filing properties due to repelling of the water-based ink composition further tend to be degraded as the non-absorbable recording medium or the low-absorbable recording medium is further low-absorbable or non-absorbable. Thus, it is advantageous to use the ink jet recording method according to the embodiment for such a recording medium. The non-absorbable recording medium or the low-absorbable recording medium are useful since the recording medium itself has water resistance and durability and recorded products can be utilized for various purposes.

Here, the "low-absorbable recording medium" or the "non-absorbable recording medium" means a recording medium with a water absorption amount of equal to or less than 10 mL/m2 in 30 msec from a start of contact in the Bristow method. The Bristow method is a method that has been most widely distributed as a method of measuring a liquid absorption amount in a short time and has also been employed by JAPAN TAPPI. Details of the test method are described in Standard No. 51 "Paper and plate paper-liquid absorbability test method-Bristow method" in "JAPAN TAPPI paper pulp test method 2000".

Also, the non-absorbable recording medium or the low-absorbable recording medium can also be classified depending on wettability of the recording surface with respect to water. For example, the recording medium can be characterized by dropping 0.5 μL of water droplets on a recording surface of the recording medium and measuring a contact angle decrease rate (comparison between a contact angle at 0.5 milliseconds after landing and a contact angle at 5 seconds). More specifically, as characteristics of the recording medium, non-absorbability of the "non-absorbable recording medium indicates that the aforementioned decrease rate is less than 1% while the low-absorbability of the "low-absorbable recording medium" indicates that the aforementioned decrease rate is equal to or greater than 1% and less than 5%. In addition, the absorbability indicates that the aforementioned decrease rate is equal to or greater than 5%. Note that the contact angles can be measured using a portable contact angle meter PCA-1 (manufactured by Kyowa Interface Science).

Although the low-absorbable recording medium is not particularly limited, examples thereof include coated paper with a coated layer for receiving oil-based ink provided on the surface thereof. Although the coated paper is not particularly limited, examples thereof include recording sheets such as art paper, coating applied paper, matte paper.

Although the non-absorbable recording medium is not particularly limited, examples thereof include a plastic film that does not have an ink absorption layer, a recording medium obtained by coating a base material such as paper with plastic, and a recording medium with a plastic film bonded thereto. Examples of the plastic described herein include polyvinyl chloride, polyethylene terephthalate, polycarbonate, polystyrene, polyurethane, polyethylene, and polypropylene.

Further, it is also possible to use an ink non-absorbable or low-absorbable recording medium such as a plate made of metal such as iron, silver, copper, or aluminum or glass in addition to the aforementioned recording medium.

The width of the recording medium in the main scanning direction is preferably equal to or greater than 50 cm, is more preferably equal to or greater than 70 cm, is further preferably equal to or greater than 80 cm, and is yet further preferably equal to or greater than 100 cm, and is particularly preferably equal to or greater than 130 cm. The width of the recording medium in the main scanning direction is preferably equal to or less than 500 cm, is more preferably equal to or less than 400 cm, is yet further preferably equal to or less than 300 cm, and is particularly preferably equal to or less than 200 cm. In a case in which the width of the recording medium in the main scanning direction falls within the aforementioned range, it is possible to record a recorded product that is useful for display or the like. Although drying tends to occur during the scanning, the embodiment is preferable since it is possible to reduce positional deviation of the ink. Also, it is easy to set the maximum time of scanning performed once to be the time described later, which is preferable.

Ink Jet Recording Method

The ink jet recording method according to the embodiment has an ink jet adhesion process in which the aforementioned ink set is used and the first ink composition and the second ink composition in the ink set are caused to adhere to a heated recording medium. Hereinafter, the recording method will be described in accordance with the procedure. Both the serial-type recording method and the line-type recording method can be used.

Processing Solution Adhesion Process

The ink jet recording method according to the embodiment includes a process of causing the processing solution to adhere to the recording medium. The processing solution adhesion process is a process in which the processing solution that contains the aggregating agent for aggregating the ink compositions is caused to adhere to the recording medium. The aggregating agent has a function of reacting with a pigment that contains the ink compositions, pigment dispersion resin that can be contained in the ink compositions, and the like and aggregating the pigment. In this manner, it is possible to suppress occurrence of bleeding or the like of an image recorded using the ink composition and to obtain an image with excellent image quality. The method of causing the processing solution to adhere is not limited, and an ink jet method, a roll coating method, a spray method, or the like can be used. Among the methods, the ink jet method is preferably used.

In the embodiment, the processing solution is preferably caused to adhere to the recording region to which the ink composition has to be adhere in the main scanning before the main scanning or in the main scanning, and the former is more preferably employed. Note that the timing of the adhesion of the processing solution is not limited to the aforementioned mode.

Ink Composition Adhesion Process

The ink composition adhesion process is a process of ejecting ink set including the first ink composition and the second ink composition from the ink jet head and causing the ink composition to adhere to the low-absorbable or non-absorbable recording medium 1. The order in which the first ink composition and the second ink composition are ejected is not limited.

In an example of a serial-type recording method according to the embodiment, the ink adhesion processing is performed by main scanning in which the ink composition is ejected while the relative positions of the ink jet head 3 and the recording medium 1 are changed in the main scanning direction and the sub scanning in which the relative positions of the carriage 2 and the recording medium 1 are changed in the sub scanning direction that intersects the main scanning direction. In addition, images are recorded such that the image of the first ink composition and the image of the second ink composition overlap with each other on the recording medium. In this manner, it is possible to perform recording on a recording medium with a wide lateral width without using a large head such as a line head.

The ink composition adhesion process is preferably performed by performing the main scanning, in which the ink compositions are ejected while the relative positions of the ink jet head including the ink set and the recording medium is changed in the main scanning direction, a plurality of times.

It is possible to employ the serial-type recording method using the configuration of the heads (ink jet heads) in FIG. 4, for example. For example, it is only necessary to fill the first nozzle array of the first head mounted on the carriage in FIG. 4 with the processing solution, to fill one nozzle array of the second head with the first ink, and to fill one nozzle array of the third head with the second ink. In this case, the processing solution is caused to adhere to the recording medium, and while the recording is caused to advance, the first ink is caused to adhere to the recording region to which the processing solution has been caused to adhere, and the second ink is caused to adhere to the region to which the first ink has been caused to adhere. In such a case, the ink jet head for ejecting the first ink and the ink jet head for ejecting the second ink are mounted on the same carriage. In this case, the configuration of the recording apparatus can be simpler than that in the case in which the first head and the second head are mounted on separate carriages, which is preferable. Meanwhile, since the adhesion of the first ink and the adhesion of the second ink are performed by moving the same carriage, it is necessary to pay attention to positioning of the image of the first ink and the image of the second ink, and the invention is particularly useful. In such an example, the first ink and the second ink are ejected from the heads mounted on the same carriage, and the arrangement thereof is not limited to the aforementioned arrangement of the heads.

The maximum time of the main scanning performed once is preferably equal to or greater than 0.8 seconds. "The maximum time of the scanning performed once" is a time during which one point of the ink jet head faces the recording medium in a case in which recording is performed from an end to an end in the scanning direction of the recording medium in the scanning performed once. Note that the scanning may be performed in a time that is shorter than the aforementioned maximum time of the scanning performed once in accordance with the image to be recorded when the recording method is performed. The maximum time of the scanning performed once is more preferably from 0.8 to 5 seconds, is more preferably equal to or greater than 0.8 seconds and equal to or less than 4 seconds, is further preferably equal to or greater than 1 second and equal to or less than 3 seconds, and is particularly preferably from 1.5 to 2.5 seconds.

The maximum time of the scanning performed once is preferably equal to or less than the aforementioned range in terms of more excellent reduction of positional deviation of the images. Also, the maximum time of the scanning performed once is preferably equal to or less than the aforementioned range since it is possible to create a recorded product on a recording medium with a wide width that is useful for display or the like. In contrast, although the ink at the nozzles during the scanning tends to be dried, and the positional deviation of the images tends to occur as the maximum time of the scanning increases, the embodiment is preferable since it is possible to reduce the positional deviation of the ink. Note that an average scanning speed of the scanning is preferably from 60 to 100 cm/second.

In the embodiment, it is possible to perform the ink adhesion process in the line-type recording method. In a case in which the line-type recording method is performed, it is only necessary to perform the recording using the aforementioned line-type recording apparatus, for example. This is preferable since it is possible to increase the recording speed. In this case, it is also possible to reduce an increase in the positional deviation between the image of the first ink and the image of the second ink during the scanning, which is preferable.

Heating Process

In the ink composition adhesion process, it is preferable that the recording medium 1 be heated by using a heating mechanism and that the ink adhesion process is performed on the heated recording medium 1. The mechanism that heats the recording medium in the ink adhesion process is not limited to the platen heater, and the mechanism may be a blowing mechanism that feeds air with heat to the recording medium or a mechanism that irradiates the recording medium with radiation that generates heat.

In the ink composition adhesion process, the surface temperature of the recording medium is preferably from 27 to 50° C., is more preferably from 28 to 45° C., is further preferably from 29 to 40° C., is yet further preferably from 30 to 38° C., and is particularly preferably from 32 to 38° C. The temperature is a surface temperature of a portion that receives adhesion of the ink in the recording surface of the recording medium and is an average temperature during recording in a case in which recording is performed for a long time. The surface temperature of the recording medium in the case of performing the heating process is preferably equal to or greater than 30° C.

The heating process is preferably provided in terms of excellent image quality and further excellent abrasion resistance, reduction of clogging, and high glossiness. Meanwhile, it is expected that the ink in the nozzles of the ink jet head tends to be dried due to influences of heat and positional deviation of images occurs since an ink ejection speed varies and timings at which ink droplets leave the nozzles vary. However, according to the embodiment, it is possible to reduce the positional deviation of the ink.

According to the ink jet recording method of the embodiment, it is possible to suppress the positional deviation between the image of the first ink composition and the image of the second ink composition in the ink jet recording method that is performed by causing the ink to adhere to the heated recording medium.

In addition, the ink composition adhesion process preferably includes a blowing process in which air is fed to the recording medium using a blowing mechanism that feeds the air. The blowing processing may be performed in the aforementioned heating process, or wind at the ordinary temperature with no heat may be fed. With the blowing process, it is possible to further promote the drying of the ink that has been caused to adhere to the recording medium and to achieve more excellent image quality, which is preferable.

Ink Composition Post-Drying Process

The post-heater 5 dries the recording medium to which the ink compositions have adhered after the adhesion of the ink compositions. In this manner, the resin contained in the ink compositions on the recording medium is melted, and a recorded product with satisfactory filling properties can be formed. At that time, the heating temperature of the recording medium using the post-heater 5 is preferably from 50 to 150° C., is more preferably equal to or greater than 70° C. and equal to or less than 120° C., and is further preferably equal to or greater than 80° C. and equal to or less than 110° C. The drying temperature within the aforementioned range tends to further improve abrasion resistance.

EXAMPLES

Hereinafter, the invention will be more specifically described using embodiments and comparative examples. The invention is not limited to the following examples in any sense.

Preparation of Processing Solution and Ink Composition

The respective materials were mixed with the compositions (% by mass) shown in Table 1 below and were sufficiently stirred, thereby preparing various processing solutions, first ink compositions, and second ink compositions. The content of the pigments, the resin, the waxes are content in the ink or the like in terms of solid content. In the examples, white color ink compositions were prepared as the first ink compositions, and the non-white color ink composition, specifically, cyan ink compositions were prepared as the second ink compositions. As the pigments, dispersant resin (water-soluble styrene-acrylic resin) was mixed with water at a mass ratio between the pigment and dispersant resin of 5:1 and was stirred with a bead mill, thereby preparing pigment dispersions, and these were used to prepare the ink. The solid content of the pigments was total solid content of the pigments and the dispersant resin. In a case in which hydrate of a polyvalent metal salt was used as the aggregating agent, the solid content excluding water of hydrate was regarded as the solid content.

TABLE 1

| | Ink name | Processing solution | | | | | White color ink | | | |
|---|---|---|---|---|---|---|---|---|---|---|
| | | PS-A | PS-B | PS-C | PS-D | PS-E | WH-A | WH-B | WH-C | WH-D |
| Solid content | Aggregating agent A | 7 | 7 | 7 | 14 | 0 | 0 | 0 | 0 | 0 |
| | Aggregating agent B | 0 | 0 | 0 | 0 | 7 | 0 | 0 | 0 | 0 |
| | Pigment | 0 | 0 | 0 | 0 | 0 | 10 | 10 | 7 | 10 |
| | Resin | 0 | 0 | 0 | 0 | 0 | 5 | 5 | 5 | 5 |
| | Wax | 0 | 0 | 0 | 0 | 0 | 2 | 2 | 2 | 2 |
| Solvent | Propylene glycol | 7 | 7 | 6 | 7 | 7 | 6 | 4 | 6 | 4.5 |
| | 2-methyl1,3-propanediol | 3 | 3 | 2 | 3 | 3 | 2 | 3 | 2 | 2 |
| | 2pyrrolidone | 20 | 17.5 | 15 | 20 | 20 | 12 | 15 | 12 | 10 |
| | Surfactant | 1 | 1 | 1 | 1 | 1 | 1 | 1 | 1 | 1 |
| | Water | 62 | 64.5 | 69 | 55 | 62 | 62 | 60 | 65 | 65.5 |
| | Total | 100 | 100 | 100 | 100 | 100 | 100 | 100 | 100 | 100 |
| | Concentration of solid content (% by mass) | 7 | 7 | 7 | 14 | 7 | 17 | 17 | 14 | 17 |
| | Concentration of solvent (% by mass) | 30 | 27.5 | 23 | 30 | 30 | 20 | 22 | 20 | 16.5 |
| | Viscosity (mPa · s) | 4.5 | 4.1 | 3.7 | 5.3 | 5.2 | 5 | 5.3 | 4.5 | 4.3 |

| | Ink name | White color ink | | | Non-white color ink | | | |
|---|---|---|---|---|---|---|---|---|
| | | WH-E | WH-F | WH-G | NWH-A | NWH-B | NWH-C | NWH-D |
| Solid content | Aggregating agent A | 0 | 0 | 0 | 0 | 0 | 0 | 0 |
| | Aggregating agent B | 0 | 0 | 0 | 0 | 0 | 0 | 0 |
| | Pigment | 4 | 10 | 8 | 5 | 5 | 5 | 5 |
| | Resin | 5 | 5 | 1 | 3 | 3 | 3 | 3 |
| | Wax | 2 | 2 | 2 | 1 | 1 | 1 | 1 |
| Solvent | Propylene glycol | 6 | 6 | 6 | 7 | 8 | 8 | 5 |
| | 2-methyl1,3-propanediol | 2 | 2 | 2 | 3 | 3 | 3 | 2 |
| | 2pyrrolidone | 12 | 20 | 12 | 20 | 22 | 25 | 15 |
| | Surfactant | 1 | 1 | 1 | 1 | 1 | 1 | 1 |
| | Water | 68 | 54 | 68 | 60 | 57 | 54 | 68 |
| | Total | 100 | 100 | 100 | 100 | 100 | 100 | 100 |
| | Concentration of solid content (% by mass) | 11 | 17 | 11 | 9 | 9 | 9 | 9 |
| | Concentration of solvent (% by mass) | 20 | 28 | 20 | 30 | 33 | 36 | 22 |
| | Viscosity (mPa · s) | 4.2 | 5.7 | 4.1 | 5.5 | 6 | 6.5 | 5 |

The ink materials represented in Table 1 are as follows.
Aggregating agent A: polyvalent metal salt "magnesium sulfate heptahydrate"
Aggregating agent B: cationic polymer "Catiomaster PD-7"
Pigment (white color ink): Pigment White 6 (titanium dioxide pigment)
Pigment (non-white color ink): Pigment Blue 15:3
Resin: Styrene acrylic "Joncryl 62" resin emulsion
Wax: Polyethylene-based "AQ515"; wax emulsion
Surfactant: Silicon-based "BYK348"

The viscosity of the ink shown in Table 1 was a value measured using an MCR300 rheometer (manufactured by Anton Paar) while holding the temperature of the ink at 20° C.)

As represented in Tables 2 to 4, recording was performed and various kinds of evaluation were conducted while combinations and various conditions of the processing solutions and the ink compositions used in the ink jet recording method were changed. Hereinafter, details of the conditions of the recording method and the respective evaluation tests will be described.

TABLE 2

| Name of composition | Example 1 | | | Example 2 | | | Example 3 | | | Example 4 | | |
|---|---|---|---|---|---|---|---|---|---|---|---|---|
| | Processing solution P-A | First ink WH-A | Second ink NWH-A | Processing solution P-B | First ink WH-A | Second ink NWH-A | Processing solution P-A | First ink WH-B | Second ink NWH-A | Processing solution P-A | First ink WH-C | Second ink NWH-A |
| Content of solid content (% by mass) | 7 | 17 | 9 | 7 | 17 | 9 | 7 | 17 | 9 | 7 | 14 | 9 |
| Difference of content of solid content $1^{st}$ – P, $1^{st}$ – $2^{nd}$ | 10 | — | 8 | 10 | — | 8 | 10 | — | 8 | 7 | — | 5 |
| Content of solvent (% by mass) | 30 | 20 | 30 | 27.5 | 20 | 30 | 30 | 22 | 30 | 30 | 20 | 30 |
| Difference of content of solvent P – $1^{st}$, $2^{nd}$ – $1^{st}$ | 10 | — | 10 | 7.5 | — | 10 | 8 | — | 8 | 10 | — | 10 |
| Content of water (% by mass) | 62 | 62 | 60 | 64.5 | 62 | 60 | 62 | 60 | 60 | 62 | 65 | 60 |
| Difference of content of water $1^{st}$ – P, $1^{st}$ – $2^{nd}$ | 0 | — | 2 | −2.5 | — | 2 | −2 | — | 0 | 3 | — | 5 |
| Viscosity (mPa·s, 20° C.) | 4.5 | 5 | 5.5 | 4.1 | 5 | 5.5 | 4.5 | 5.3 | 5.5 | 4.5 | 4.5 | 5.5 |
| Difference of viscosity $1^{st}$ – P, $1^{st}$ – $2^{nd}$ | 0.5 | — | −0.5 | 0.9 | — | −0.5 | 0.8 | — | −0.2 | 0 | — | −1 |
| Temperature of recording medium during adhesion (° C.) | 35 | | | 35 | | | 35 | | | 35 | | |
| Maximum pass time (seconds) | 2.2 | | | 2.2 | | | 2.2 | | | 2.2 | | |
| Width of recording medium (cm) | 160 | | | 160 | | | 160 | | | 160 | | |
| Evaluation | | | | | | | | | | | | |
| Positional deviation between images ($1^{st}$ – $2^{nd}$) | A | | | A | | | B | | | B | | |
| Image quality (white) | | A | A | | A | B | | A | B | | A | B |
| Bleeding at end of image (white) | | A | A | | A | B | | A | A | | B | A |
| Whiteness | | A | | | A | | | A | | | B | |
| Abrasion resistance (white) | | A | | | A | | | A | | | A | |
| Clogging resistance (white) | | A | | | A | | | A | | | A | |

TABLE 2-continued

|  | Example 5 | | | Example 6 | | | Example 7 | | |
| --- | --- | --- | --- | --- | --- | --- | --- | --- | --- |
| Name of composition | Processing solution P-A | First ink WH-A | Second ink NWH-B | Processing solution P-A | First ink WH-A | Second ink NWH-A | Processing solution P-A | First ink WH-A | Second ink NWH-A |
| Content of solid content (% by mass) | 7 | 17 | 9 | 7 | 17 | 9 | 7 | 17 | 9 |
| Difference of content of solid content $1^{st}$ – P, $1^{st}$ – $2^{nd}$ | 10 | — | 8 | 10 | — | 8 | 10 | — | 8 |
| Content of solvent (% by mass) | 30 | 20 | 33 | 30 | 20 | 30 | 30 | 20 | 30 |
| Difference of content of sovent P – $1^{st}$, $2^{nd}$ – $1^{st}$ | 10 | — | 13 | 10 | — | 10 | 10 | — | 10 |
| Content of water (% by mass) | 62 | 65 | 57 | 62 | 62 | 60 | 62 | 62 | 60 |
| Difference of content of water $1^{st}$ – P, $1^{st}$ – $2^{nd}$ | 0 | — | 5 | 0 | — | 2 | 0 | — | 2 |
| Viscosity (mPa · s, 20° C.) | 4.5 | 5 | 6 | 4.5 | 5 | 5.5 | 4.5 | 5 | 5.5 |
| Difference of viscosity $1^{st}$ – P, $1^{st}$ – $2^{nd}$ | 0.5 | — | −1 | 0.5 | — | −0.5 | 0.5 | — | −0.5 |
| Temperature of recording medium during adhesion (° C.) |  | 35 |  |  | 40 |  |  | 50 |  |
| Maximum pass time (seconds) |  | 2.2 |  |  | 2.2 |  |  | 2.2 |  |
| Width of recording medium (cm) |  | 160 |  |  | 160 |  |  | 160 |  |
| Evaluation | | | | | | | | | |
| Positional deviation between images ($1^{st}$ – $2^{nd}$) |  | B |  |  | B |  |  | C |  |
| Image quality (white) |  | A A |  |  | A B |  |  | A B |  |
| Bleeding at end of image (white) |  | A A |  |  | A B |  |  | A B |  |
| Whiteness |  | A |  |  | B |  |  | C |  |
| Abrasion resistance (white) |  | A |  |  | B |  |  | C |  |
| Clogging resistance (white) |  |  |  |  |  |  |  |  |  |

TABLE 3

| | Example 8 | | | Example 9 | | | Example 10 | | | Example 11 | | | Example 12 | | |
|---|---|---|---|---|---|---|---|---|---|---|---|---|---|---|---|
| Name of composition | Processing solution P-A | First ink WH-D | Second ink NWH-A | Processing solution P-A | First ink WH-A | Second ink NWH-C | Processing solution P-E | First ink WH-D | Second ink NWH-A | Processing solution P-A | First ink WH-A | Second ink NWH-A | Processing solution P-A | First ink WH-A | Second ink NWH-A |
| Content of solid content (% by mass) | 7 | 17 | 9 | 7 | 17 | 9 | 7 | 17 | 9 | 7 | 17 | 9 | 7 | 17 | 9 |
| Difference of content of solid content $1^{st}$ – P, $1^{st}$ – $2^{nd}$ | 10 | — | 8 | 10 | — | 8 | 10 | — | 8 | 10 | — | 8 | 10 | — | 8 |
| Content of solvent (% by mass) | 30 | 16.5 | 30 | 30 | 20 | 36 | 30 | 16.5 | 30 | 30 | 20 | 30 | 30 | 20 | 30 |
| Difference of content of solvent P – $1^{st}$, $2^{nd}$ – $1^{st}$ | 13.5 | — | 13.5 | 10 | — | 16 | 13.5 | — | 13.5 | 10 | — | 10 | 10 | — | 10 |
| Content of water (% by mass) | 62 | 65.5 | 60 | 62 | 62 | 54 | 62 | 65.5 | 60 | 62 | 62 | 60 | 62 | 62 | 60 |
| Difference of content of water P – $1^{st}$, $2^{nd}$ – $1^{st}$ | 3.5 | — | 5.5 | 0 | — | 8 | 3.5 | — | 5.5 | 0 | — | 2 | 0 | — | 2 |
| Viscosity (mPa · s, 20° C.) | 4.5 | 4.3 | 5.5 | 4.5 | 5 | 6.5 | 5.2 | 4.3 | 5.5 | 4.5 | 5 | 5.5 | 4.5 | 5 | 5.5 |
| Difference of viscosity P – $1^{st}$, $2^{nd}$ – $1^{st}$ | −0.2 | — | −1.2 | 0.5 | — | −1.5 | −0.9 | — | −1.2 | 0.5 | — | −0.5 | 0.5 | — | −0.5 |
| Temperature of recording medium during adhesion (° C.) | 35 | | | 35 | | | 35 | | | 35 | | | 35 | | |
| Maximum pass time (seconds) | 2.2 | | | 2.2 | | | 2.2 | | | 2.4 | | | 2.6 | | |
| Width of recording medium (cm) | 160 | | | 160 | | | 160 | | | 170 | | | 198 | | |
| Evaluation | | | | | | | | | | | | | | | |
| Positional deviation between images ($1^{st}$ – $2^{nd}$) | C | | | C | | | C | | | B | | | C | | |
| Image quality (white) | A | | | A | | | B | | | A | | | A | | |
| Bleeding at end of image (white) | A | | | A | | | A | | | B | | | B | | |
| Whiteness | A | | | A | | | B | | | A | | | A | | |
| Abrasion resistance (white) | B | | | A | | | A | | | A | | | A | | |
| Clogging resistance (white) | A | | | A | | | A | | | A | | | B | | |

TABLE 3-continued

| | Example 13 | | | | Example 14 | | | Example 15 | | | Example 16 | |
|---|---|---|---|---|---|---|---|---|---|---|---|---|
| Name of composition | Processing solution P-E | First ink WH-D | Second ink NWH-A | Processing solution P-C | First ink WH-A | Second ink NWH-A | Processing solution P-D | First ink WH-A | Second ink NWH-A | Processing solution P-A | First ink WH-A | Second ink NWH-C |
| Content of solid content (% by mass) | 7 | 17 | 9 | 7 | 17 | 9 | 14 | 17 | 9 | 7 | 17 | 9 |
| Difference of content of solid content 1st − P, 1st − 2nd | 10 | — | 8 | 10 | — | 8 | 3 | — | 8 | 10 | — | 8 |
| Content of solvent (% by mass) | 30 | 16.5 | 30 | 23 | 20 | 30 | 30 | 20 | 30 | 30 | 20 | 36 |
| Difference of content of solvent P − 1st, 2nd, 1st | 13.5 | — | 13.5 | 3 | — | 10 | 10 | — | 10 | 10 | — | 16 |
| Content of water (% by mass) | 62 | 65.5 | 60 | 69 | 62 | 60 | 55 | 62 | 60 | 62 | 62 | 54 |
| Difference of content of water 1st − P, 1st − 2nd | 3.5 | — | 5.5 | −7 | — | 2 | 7 | — | 2 | 0 | — | 8 |
| Viscosity (mPa·s, 20° C.) | 5.2 | 4.3 | 5.5 | 3.7 | 5 | 5.5 | 5.3 | 5 | 5.5 | 4.5 | 5 | 6.5 |
| Difference of viscosity 1st − P, 1st − 2nd | −0.9 | — | −1.2 | 1.3 | — | −0.5 | −0.3 | — | −0.5 | 0.5 | — | −1.5 |
| Temperature of recording medium during adhesion (° C.) | 35 | | | | 35 | | | 35 | | | 35 | |
| Maximum pass time (seconds) | 1 | | | | 2.2 | | | 2.2 | | | 2.2 | |
| Width of recording medium (cm) | 71 | | | | 160 | | | 160 | | | 160 | |
| Evaluation | | | | | | | | | | | | |
| Positional deviation between images (1st − 2nd) | B | | | | A | | | A | | | B | |
| Image quality (white) | B | | | | A | | | A | | | B | |
| Bleeding at end of image (white) | A | | | | C | | | C | | | A | |
| Whiteness | B | | | | A | | | A | | | A | |
| Abrasion resistance (white) | A | | | | B | | | B | | | A | |
| Clogging resistance (white) | A | | | | A | | | A | | | A | |

TABLE 4

| Name of composition | Example 17 | | | Example 18 | | | Comparative Example 1 | | | Comparative Example 2 | | | Comparative Example 3 | | |
|---|---|---|---|---|---|---|---|---|---|---|---|---|---|---|---|
| | Processing solution P-A | First ink WH-B | Second ink NWH-A | Processing solution | First ink WH-A | Second ink NWH-A | Processing solution P-A | First ink WH-E | Second ink NWH-A | Processing solution P-A | First ink WH-F | Second ink NWH-A | Processing solution P-A | First ink WH-G | Second ink NWH-A |
| Content of solid content (% by mass) | 7 | 17 | 9 | — | 17 | 9 | 7 | 11 | 9 | 7 | 17 | 9 | 7 | 11 | 9 |
| Difference of content of solid content 1$^{st}$ – P, 1$^{st}$ – 2$^{nd}$ | 10 | — | 8 | — | — | 8 | 4 | — | 2 | 10 | — | 8 | 4 | — | 2 |
| Content of solvent (% by mass) | 30 | 22 | 30 | — | 20 | 30 | 30 | 20 | 30 | 30 | 28 | 30 | 30 | 20 | 30 |
| Difference of content of solvent P – 1$^{st}$, 2$^{nd}$ – 1$^{st}$ | 8 | — | 8 | — | — | 10 | 10 | — | 10 | 2 | — | 2 | 10 | — | 10 |
| Content of water (% by mass) | 62 | 60 | 60 | — | 62 | 60 | 62 | 68 | 60 | 62 | 54 | 60 | 62 | 68 | 60 |
| Difference of content of water 1$^{st}$ – P, 1$^{st}$ – 2$^{nd}$ | -2 | — | 0 | — | — | 2 | 6 | — | 8 | -8 | — | -6 | 6 | — | 8 |
| Viscosity (mPa · s, 20° C.) | 4.5 | 5.3 | 5.5 | — | 5 | 5.5 | 4.5 | 4.2 | 5.5 | 4.5 | 5.7 | 5.5 | 4.5 | 4.1 | 5.5 |
| Difference of viscosity P – 1$^{st}$, 2$^{nd}$ – 1$^{st}$ | 0.8 | — | -0.2 | — | — | -0.5 | 0.3 | — | -1.3 | 1.2 | — | -0.2 | -0.4 | — | -1.4 |
| Temperature of recording medium during adhesion (° C.) | | 35 | | | 50 | | | 35 | | | 35 | | | 35 | |
| Maximum pass time (seconds) | | 1.7 | | | 2.2 | | | 2.2 | | | 2.2 | | | 2.2 | |
| Width of recording medium (cm) | | 120 | | | 160 | | | 160 | | | 160 | | | 160 | |
| Evaluation | | | | | | | | | | | | | | | |
| Positional deviation between images (1$^{st}$ – 2$^{nd}$) | | A | | | C | | | D | | | D | | | D | |
| Image quality (white) | | B | | | B | | | A | | | A | | | A | |
| Bleeding at end of image (white) | | A | | | B | | | C | | | C | | | C | |
| Whiteness | | A | | | B | | | C | | | A | | | B | |
| Abrasion resistance (white) | | A | | | A | | | A | | | A | | | C | |
| Clogging resistance (white) | | A | | | C | | | A | | | C | | | A | |

TABLE 4-continued

| | Comparative Example 4 | | | Reference Example 1 | | | Reference Example 2 | | |
|---|---|---|---|---|---|---|---|---|---|
| Name of composition | Processing solution P-A | First ink WH-A | Second ink NWH-D | Processing solution P-A | First ink WH-E | Second ink NWH-A | Processing solution P-A | First ink WH-F | Second ink NWH-A |
| Content of solid content (% by mass) | 7 | 17 | 9 | 7 | 11 | 9 | 7 | 17 | 9 |
| Difference of content of solid content $1^{st}$ − P, $1^{st}$ − $2^{nd}$ | 10 | — | 8 | 4 | — | 2 | 10 | — | 8 |
| Content of solvent (% by mass) | 30 | 20 | 22 | 30 | 20 | 30 | 30 | 28 | 30 |
| Difference of content of solvent P − $1^{st}$, $2^{nd}$ − $1^{st}$ | 10 | — | 2 | 10 | — | 10 | 2 | — | 2 |
| Content of water (% by mass) | 62 | 62 | 68 | 62 | 68 | 60 | 62 | 54 | 60 |
| Difference of content of water $1^{st}$ − P, $1^{st}$ − $2^{nd}$ | 0 | — | −6 | 6 | — | 8 | −8 | — | −6 |
| Viscosity (mPa · s, 20° C.) | 4.5 | 5 | 5 | 4.5 | 4.2 | 5.5 | 4.5 | 5.7 | 5.5 |
| Difference of viscosity $1^{st}$ − P, $1^{st}$ − $2^{nd}$ | 0.5 | — | 0 | −0.3 | — | −1.3 | 1.2 | — | 0.2 |
| Temperature of recording medium during adhesion (° C.) | | 35 | | | 25 | | | 25 | |
| Maximum pass time (seconds) | | 2.2 | | | 2.2 | | | 2.2 | |
| Width of recording medium (cm) | | 160 | | | 160 | | | 160 | |
| Evaluation | | | | | | | | | |
| Positional deviation between images ($1^{st}$ − $2^{nd}$) | | D | | | B | | | B | |
| Image quality (white) | | A | | | C | | | C | |
| Bleeding at end of image (white) | | A | | | B | | | B | |
| Whiteness | | A | | | C | | | B | |
| Abrasion resistance (white) | | A | | | A | | | A | |
| Clogging resistance (white) | | A | | | A | | | B | |

Recording Test

A modified machine of SC-S40650 manufactured by Seiko Epson Corporation was produced. Three heads were arranged on the upstream side, the downstream side thereof, and the further downstream side thereof in the transport direction of the recording medium as illustrated in FIG. 4. The heads were regarded as a first head, a second head, and a third head from the upstream side. One nozzle array of the first head was filled with the processing solution, one nozzle array of the second head was filled with the white color ink (first ink composition), and one nozzle array of the third head was filled with the non-white color ink (second ink composition). Adhesion of the processing solution, the white color ink, and the non-white color ink were enabled to adhere to the recording medium in this order. A platen heater was provided as a common platen that faced the three heads. The platen heater was activated, and the surface temperature of the recording medium during the adhesion process was set to the values in the table. However, the platen heater was stopped, and heating was not performed in the example in which the surface temperature was 25° C. The secondary drying was performed with a post-heater on the downstream side beyond the heads. The secondary drying was performed at 85° C. for about 30 seconds.

Recording Medium

As the recording medium, LAG jet E-1000ZC (manufactured by Lintec Corporation; transparent film) was used. This was cut or attached to obtain the width of the recording medium that met each value in each example. The time of the scanning performed once was set to each value in the table in accordance with the width of the recording medium.

Patterns for evaluation other than evaluation of positional deviation between images were recorded under the following recording conditions. The amounts and the density of ink dots were adjusted such that resolution of 1440×1400 dpi was achieved at a maximum for each of the processing solution and the ink and the amounts of adhesion met the following values.

Ink: the amount of adhesion of 12 mg/inch2 for each kind of ink

Processing solution: the amount of adhesion of 10% by mass with respect to the total amount of adhesion of used ink The recording pattern formed on the recording medium after the recording was performed was evaluated. Hereinafter, the content of the respective evaluation tests will be described.

Positional Deviation Between Images

Lines were recorded at one end and the other end by using a nozzle array filled with the first ink to perform main scanning from the one end to the other end of a recordable range on the recording medium in the main scanning direction through main scanning performed once. Each line was a line extending in the sub scanning direction, and the length of the line in the sub scanning direction was set to 1 cm. Next, the sub scanning was performed, and the carriage was returned. Then, the nozzle array filled with the second ink was used to perform the main scanning from the one end to the other end such that a line overlaps with the line recorded with the first ink, thereby recording the lines at the one end and the other end. The length of the line of the second ink in the sub scanning direction was also set to 1 cm. The ink was ejected at the same position such that the position of the line of the first ink and the position of the line of the second ink in the main scanning direction theoretically overlap with each other. At this time, lines were similarly recorded in the next region on the recording medium in the sub scanning direction with the first ink. The sub scanning and the carriage return were performed, and the line of the second ink was recorded in the next main scanning such that the line of the second ink overlaps with the line recorded with the first ink in the previous main scanning. This was performed successively in 30 minutes. Note that flashing was performed with the nozzles on flashing boxes provided on both outer sides of the recording medium every time the carriage was moved. After the recording, positional deviation between the line of the first ink and the line of the second ink in the main scanning direction was checked for each line recorded at the other end in the main scanning direction, and the maximum amount of deviation was checked. Note that no positional deviation occurred for the lines recorded at one end in the main scanning direction in all the examples.

A: The amount of deviation was equal to or less than 0.1 mm.

B: The amount of deviation was greater than 0.1 mm and equal to or less than 0.3 mm.

C: The amount of deviation was greater than 0.3 mm and equal to or less than 0.6 mm.

D: The amount of deviation was greater than 0.6 mm.

Bleeding at End of Image

The size of each of test patterns for evaluation was set to 3×3 cm, and the test patterns were recorded in line over the entire recordable region on the recording medium in the main scanning direction at a gap of 1 cm between the patterns. For the patterns, the processing solution and the white color ink were ejected at the same position such that the respective patterns thereof theoretically overlapped with each other. The patterns were also recorded in line at an interval of 1 cm between the patterns in the sub scanning direction. The non-white ink was not used. Flashing of the nozzles was performed every time the main scanning was performed.

The recording test was performed successively for 30 minutes, and whether or not a state in which density irregularity of white was present at end portions in the main scanning direction as compared with the inner side of the white color pattern was visually observed for each pattern.

A: The state in which the density irregularity was seen at the end portions as compared with the inner side of the pattern was not observed.

B: The state in which the density irregularity was seen at the end portions as compared with the inner side of the pattern was slightly observed.

C: The state in which the density irregularity was seen at the end portions as compared with the inner side of the pattern was noticeable.

Clogging Resistance (White)

Recording was successively performed for two hours under conditions of an image end bleeding test, and ejection of the white nozzle array was inspected after the recording.

A: There were no nozzles that did not eject the ink.

B: The proportion of the nozzles that did not eject the ink was equal to or less than 2%.

C: The proportion of the nozzles that did not eject the ink was greater than 2% and equal to or less than 4%.

D: The proportion of the nozzles that did not eject the ink was greater than 4%.

Abrasion Resistance (White)

Patterns were recorded using only the processing solution and the white color ink. The patterns were rubbed ten times with cloth under a load of 500 g in the JSPS abrasion resistance test.

A: Neither peeling of the pattern portion nor the color transfer to the cotton cloth were observed.

B: Although no peeling of the pattern portion was observed, slight color transfer to the cotton cloth was observed.
C: Peeling of the pattern portion was observed.
Whiteness Patterns were recorded using only the processing solution and the white color ink. The whiteness (L*) of the images was measured using a spectrophotometer Gretag Macbeth Spectrolino (name of product manufactured by X-RITE). A black base sheet with an OD value of 2.1 was used as a base for the measurement.
A: The L* value was equal to or greater than 75.
B: The L* value was equal to or greater than 70 and less than 75.
C: The L* value was less than 70.
Image Quality (White)

Patterns were recorded using only the processing solution and the white color ink. The patterns were visually evaluated.
A: No density irregularity was observed in the pattern.
B: Slight density irregularity was observed in the pattern.
C: Noticeable density irregularity was observed in the pattern.

The findings described below were obtained from the results of the examples and the comparative examples.

In all the examples, in which the content of the solid content in the first ink was greater than that in the second ink by 5% by mass or greater and the content of the organic solvent in the second ink was greater than that in the first ink by 7% by mass or greater, which included the heating process, excellent suppression of the positional deviation between the images was achieved. Meanwhile, the suppression of the positional deviation between the images was inferior in all the comparative examples in which such conditions were not satisfied. Details will be described below.

In comparison of Examples 1, 6, and 7 and comparison of Examples 16 and 9, more excellent suppression of the positional deviation between the images and more excellent clogging resistance were achieved as the recording temperature in the ink adhesion process was lower. This was estimated to be because in the case in which the recording temperature was high, drying of the nozzles advanced, and this affected the clogging resistance and the positional deviation between the images. Also, this was estimated to be because the drying of the nozzles advanced during the main scanning and the positional deviation between the images occurred since no positional deviation between the images occurred for the lines recorded at one end in the main scanning direction in the evaluation for the positional deviation between the images. Also, it was discovered that the invention was useful since it was possible to suppress the positional deviation between the images in the case of obtaining excellent image quality by performing the heating process on the basis of the result that more excellent image quality was achieved as the recording temperature in the ink adhesion process was higher.

In comparison of Examples 1, 11, and 12 and comparison of examples 17 and 3, more excellent results were obtained in the tests for the positional deviation between the images and the bleeding at the end of the images as the pass time in the ink adhesion process was shorter. Meanwhile, it was discovered that the invention was particularly useful since it was possible to suppress the positional deviation between the images and the like even in the recording with a long pass time on the basis of the result that it was further possible to record a recorded product for display as the pass time was longer.

In Examples 1 to 13, 16, and 17 in which the content of the solid content in the first ink was greater than that in the processing solution by 5% by mass or greater and the content of the organic solvent in the processing solution was greater than that in the first ink by 7% by mass or greater, it was possible to suppress the bleeding at the ends of the images as compared with Comparative Examples 1 to 3 and Examples 14 and 15 in which such conditions were not satisfied, and it was discovered that the positional deviation between the image of the first ink and the image of the processing solution was able to be suppressed in these examples.

In Examples 1 to 4 in which the difference between the content of water in the first ink and the content of water in the second ink was within 5.5% by mass, it was possible to further suppress the positional deviation between the images as compared with Example 9 in which the difference of the content of water was large.

In Examples 1 to 4 in which the difference between the viscosity of the first ink and the viscosity of the second ink at 20° C. was within 1 mPa·s, it was possible to further suppress the positional deviation between the images as compared with Examples 8 to 10 in which the difference of the viscosity exceeded 1 mPa·s.

The effect of suppressing the positional deviation between the images was obtained even in the case in which the processing solution was not used in Example 18.

In Reference Examples 1 and 2, image quality was inferior while suppression of the positional deviation between the images was not poor in a case in which the heating process was not used regardless of utilization of the first ink and the second ink that did not satisfy the conditions that the content of the solid content in the first ink was greater than that in the second ink by 5% by mass or greater and the content of the organic solvent in the second ink was greater than that in the first ink by 7% by mass or greater. It was discovered from this result that the invention was needed since excellent suppression of the positional deviation between the images was achieved in a case in which the heating process was performed to obtain excellent image quality.

The entire disclosures of Japanese Patent Application Nos. 2018-056043 filed Mar. 23, 2018 and 2018-194400 filed Oct. 15, 2018 are expressly incorporated herein by reference.

What is claimed is:

1. An ink set for ink jet recording that adheres ink to a heated recording medium, the ink set comprising:
   a first water-based ink composition containing a first solid content including a first coloring material and a first organic solvent; and
   a second water-based ink composition containing a second solid content including a second coloring material and a second organic solvent,
   wherein there is 5% by mass or more of the first solid content in the first ink composition than the second solid content in the second ink composition, and
   there is 7% by mass or more of the second organic solvent in the second ink composition than the first organic solvent in the first ink composition.

2. The ink set according to claim 1, further comprising:
   a processing solution that includes an aggregating agent for aggregating constituents of the first and second water-based ink jet ink compositions, the processing solution containing a third solid content including a third organic solvent, wherein there is 5% by mass or more of the first solid content in the first ink composition than the third solid content in the processing solution, and there is 7% by mass or more of the third organic solvent in the processing solution than the first organic solvent in the first ink composition.

3. The ink set according to claim 1, wherein the first ink composition contains a first amount of water; and the second ink composition contains a second amount of water within 8% by mass of the first amount of water.

4. The ink set according to claim 1, wherein the first ink composition has a first viscosity; and the second ink composition has a second viscosity within 1.5 mPa·s at 20° C. of the first viscosity.

5. The ink set according to claim 1, wherein an amount of water in each of the first and second ink compositions is equal to or greater than 50% by mass.

6. The ink set according to claim 1, wherein there is 5 to 13% by mass more of the first solid content in the first ink composition than the second solid content in the second ink composition, and there is 7 to 17% by mass more of the second organic solvent in the second ink composition than the first organic solvent in the first ink composition.

7. The ink set according to claim 1, wherein the first ink composition contains 10 to 22% by mass of the first solid content and 15 to 27% by mass of the first organic solvent, and the second ink composition contains 5 to 12% by mass of the second solid content and 23 to 38% by mass of the second organic solvent.

8. The ink set according to claim 1, wherein the first ink composition is a white color ink composition that includes a white color coloring material as the first solid content, and the second ink composition is a non-white color ink composition that includes a non-white color coloring material as the second solid content.

9. The ink set according to claim 1, wherein there is 9% by mass or more of the second organic solvent in the second ink composition than the first organic solvent in the first ink composition.

10. An ink jet recording method that is performed using the ink set according to claim 1, the method comprising:

applying the first ink composition and the second ink composition to the heated recording medium.

11. The ink jet recording method according to claim 10, further comprising:

causing a processing solution to adhere to the recording medium, the processing solution including an aggregating agent for aggregating constituents of the first and second water-based ink jet ink compositions, the processing solution containing a third solid content including a third organic solvent, wherein there is 5% by mass or more of the first solid content in the first ink composition than the third solid content in the processing solution, and there is 7% by mass or more of the third organic solvent in the processing solution than the first organic solvent in the first ink composition.

12. The ink jet recording method according to claim 10, wherein the first ink composition contains a first amount of water; and the second ink composition contains a second amount of water within 8% by mass of the first amount of water.

13. The ink jet recording method according to claim 10, wherein the first ink composition has a first viscosity; and the second ink composition has a second viscosity within 1.5 mPa·s at 20° C. of the first viscosity.

14. The ink jet recording method according to claim 10, wherein an amount of water in each of the first and second ink compositions is equal to or greater than 50% by mass.

15. The ink jet recording method according to claim 10, wherein there is 5 to 13% by mass more of the first solid content in the first ink composition than the second solid content in the second ink composition, and there is 7 to 17% by mass more of the second organic solvent in the second ink composition than the first organic solvent in the first ink composition.

16. The ink jet recording method according to claim 10, wherein the first ink composition contains 10 to 22% by mass of the first solid content and 15 to 27% by mass of the first organic solvent, and the second ink composition contains 5 to 12% by mass of the second solid content and 23 to 38% by mass of the second organic solvent.

17. The ink jet recording method according to claim 10, wherein the first ink composition is a white color ink composition that includes a white color coloring material as the first solid content, and the second ink composition is a non-white color ink composition that includes a non-white color coloring material as the second solid content.

18. The ink jet recording method according to claim 10, wherein a surface temperature of the recording medium when the first ink composition and the second ink composition are applied thereto is from 30° C. to 50° C.

19. The ink jet recording method according to claim 10, further comprising:

applying a processing solution that includes an aggregating agent for aggregating constituents of the water-based ink jet ink composition to the recording medium.

20. The ink jet recording method according to claim 10, wherein the applying of the ink compositions is performed by performing a main scanning, in which the ink compositions are ejected while relative positions of an ink jet head provided with the ink set and the recording medium is changed in a main scanning direction, a plurality of times, and a maximum time of each main scanning is equal to or greater than 0.8 seconds.

* * * * *